US012768222B2

(12) United States Patent
Scheurich et al.

(10) Patent No.: US 12,768,222 B2
(45) Date of Patent: Oct. 20, 2026

(54) EXTENSION LADDER

(71) Applicant: Werner Co., Greenville, PA (US)

(72) Inventors: Michael Scheurich, Gilberts, IL (US); Tek Lentine, Aurora, IL (US); Jerry Lauricella, Charleston, SC (US); Slavisa Dacic, Hanover Park, IL (US); Devin Hughes, Itasca, IL (US); David Pozgay, Wilmette, IL (US)

(73) Assignee: Werner Co., Itasca, IL (US)

( * ) Notice: Subject to any disclaimer, the term of this patent is extended or adjusted under 35 U.S.C. 154(b) by 1403 days.

(21) Appl. No.: 17/379,714

(22) Filed: Jul. 19, 2021

(65) Prior Publication Data

US 2022/0025701 A1 Jan. 27, 2022

Related U.S. Application Data

(60) Provisional application No. 63/174,224, filed on Apr. 13, 2021, provisional application No. 63/055,249, filed on Jul. 22, 2020.

(51) Int. Cl.

| | |
|---|---|
| ***E06C 1/12*** | (2006.01) |
| ***E06C 7/02*** | (2006.01) |
| ***E06C 7/04*** | (2006.01) |
| ***E06C 7/06*** | (2006.01) |

(52) U.S. Cl.

CPC .................. *E06C 1/12* (2013.01); *E06C 7/02* (2013.01); *E06C 7/04* (2013.01); *E06C 7/06* (2013.01)

(58) Field of Classification Search

CPC ..... E06C 1/12; E06C 7/02; E06C 7/04; E06C 7/06; E06C 7/12; E06C 1/397; E06C 5/32; E06C 5/42; E04F 11/068

See application file for complete search history.

(56) References Cited

U.S. PATENT DOCUMENTS 139,689 A * 6/1873 Pine .......................... E06C 5/04 254/284
239,727 A * 4/1881 Cauble ...................... E06C 1/12 182/212
349,370 A * 9/1886 Springer ................... E06C 1/12 182/108

(Continued)

FOREIGN PATENT DOCUMENTS

CN 109267927 1/2019
CN 109267927 A * 1/2019 ............... E06C 7/08

(Continued)

*Primary Examiner* — Brian D Mattei
*Assistant Examiner* — Kathleen M. McFarland
(74) *Attorney, Agent, or Firm* — Fitch, Even, Tabin & Flannery LLP

(57) ABSTRACT

An extension ladder having a base section having a first base rail and a second base rail in parallel and spaced relationship with the first base rail and rungs attached to and between the first and second base rails. The extension ladder having a fly section having a first fly rail and a second fly rail in parallel and spaced relationship with the first fly rail and rungs attached to and between the first and second fly rails. The fly section in sliding engagement with the base section. The extension ladder having a force applicator attached to the base section and the fly section which offsets some or all weight of the fly section. A method for using an extension ladder. A method for manufacturing an extension ladder.

27 Claims, 44 Drawing Sheets

(56) References Cited

U.S. PATENT DOCUMENTS

| | | | | | |
|---|---|---|---|---|---|
| 697,294 | A * | 4/1902 | Totman | E06C 5/04 | 182/208 |
| 1,737,799 | A * | 12/1929 | Loetscher | E04F 11/068 | 182/79 |
| 1,767,148 | A * | 6/1930 | Marschke | E04F 11/064 | 182/78 |
| 2,198,071 | A * | 4/1940 | Vespasiano | E06C 7/185 | 182/103 |
| 2,210,803 | A * | 8/1940 | Dunn | E06C 1/12 | 182/213 |
| 2,405,505 | A * | 8/1946 | Kleidon | E06C 7/12 | 187/241 |
| 2,880,829 | A * | 4/1959 | Watkins | E06C 7/006 | 182/47 |
| 3,225,863 | A * | 12/1965 | Ludlow | E06C 7/006 | 182/104 |
| 3,386,531 | A * | 6/1968 | Sallein | E06C 9/08 | 182/85 |
| 3,871,479 | A * | 3/1975 | Pelto | A62B 5/00 | 182/86 |
| 3,966,018 | A * | 6/1976 | Kozai | E06C 7/16 | 182/103 |
| 4,181,195 | A * | 1/1980 | Clarke | E06C 7/006 | 182/230 |
| 4,364,451 | A * | 12/1982 | Wright | E06C 7/06 | 182/213 |
| 4,396,093 | A * | 8/1983 | Zimmerman | E06C 5/04 | 182/2.11 |
| 4,605,100 | A * | 8/1986 | Inglese | E06C 7/06 | 182/213 |
| 4,640,388 | A * | 2/1987 | Walborn | A62B 1/10 | 182/231 |
| 5,033,584 | A * | 7/1991 | Battle | E06C 1/22 | 182/208 |
| 5,101,215 | A * | 3/1992 | Creaser, Jr. | E04H 12/182 | 52/118 |
| 5,758,745 | A * | 6/1998 | Beggs | E06C 1/12 | 182/213 |
| 6,131,702 | A * | 10/2000 | Berridge | B66B 9/00 | 187/336 |
| 6,935,464 | B2 * | 8/2005 | Duan | E06C 7/46 | 182/213 |
| 6,991,064 | B2 * | 1/2006 | Ehrenleitner | B62D 65/18 | 182/141 |
| 7,416,055 | B2 * | 8/2008 | Penn | B66B 11/06 | 182/144 |
| 8,028,804 | B2 * | 10/2011 | Lair | E06C 1/12 | 182/78 |
| 8,292,031 | B2 * | 10/2012 | Penn | B66B 11/06 | 187/253 |
| 8,875,839 | B1 * | 11/2014 | Licea | E06C 7/186 | 182/8 |
| 9,284,777 | B1 * | 3/2016 | Licea | E06C 7/186 | |
| 9,328,557 | B2 * | 5/2016 | Hoersch | E06C 7/02 | |
| 9,598,875 | B1 * | 3/2017 | Bateman | F21V 25/00 | |
| 10,605,003 | B2 * | 3/2020 | Lanzafame | E06C 7/04 | |
| 11,225,832 | B2 * | 1/2022 | Seo | E06C 7/16 | |
| 12,023,526 | B2 * | 7/2024 | Schroder | A62B 1/04 | |
| 2007/0181370 | A1 * | 8/2007 | Kemp-Banks | E06C 7/423 | 182/204 |
| 2008/0060874 | A1 * | 3/2008 | Lair | E04F 11/064 | 182/77 |
| 2010/0219016 | A1 * | 9/2010 | Meillet | F16D 63/006 | 188/65.1 |
| 2011/0203872 | A1 * | 8/2011 | Hoersch | E06C 5/04 | 182/63.1 |
| 2014/0097042 | A1 * | 4/2014 | Wright | E06C 7/02 | 182/208 |
| 2018/0044987 | A1 * | 2/2018 | Lanzafame | E06C 5/32 | |
| 2018/0141765 | A1 * | 5/2018 | Honeycutt | B65G 69/22 | |
| 2019/0186151 | A1 * | 6/2019 | Canlas | E06C 9/14 | |
| 2019/0389677 | A1 * | 12/2019 | Honeycutt | B66F 11/044 | |
| 2021/0228915 | A1 * | 7/2021 | Schroder | A62B 1/08 | |
| 2022/0025701 | A1 * | 1/2022 | Scheurich | E06C 7/02 | |

FOREIGN PATENT DOCUMENTS

| | | | | |
|---|---|---|---|---|
| CN | 109667397 | A * | 4/2019 | E04F 11/068 |
| CN | 110104205 | A * | 8/2019 | E06C 1/383 |
| CN | 210622687 | | 5/2020 | |
| CN | 210622687 | U * | 5/2020 | |
| DE | 29713340 | U1 * | 4/1998 | |
| FR | 2614067 | A1 * | 10/1988 | E06C 1/12 |
| GB | 328573 | A * | 4/1930 | E06C 7/04 |
| GB | 428101 | A * | 5/1935 | E04F 11/068 |
| GB | 492303 | A * | 9/1938 | E04F 11/068 |
| GB | 2203129 | A * | 10/1988 | B66B 9/16 |
| GB | 2252588 | A * | 8/1992 | E04F 11/068 |
| KR | 200173011 | Y1 * | 3/2000 | E06C 1/12 |
| KR | 100725267 | | 6/2007 | |
| KR | 100725267 | B1 * | 6/2007 | E06C 1/397 |
| KR | 100949777 | B1 * | 3/2010 | E06C 7/02 |
| KR | 101767014 | | 8/2017 | |
| KR | 101767014 | B1 * | 8/2017 | E06C 1/39 |
| KR | 20180101734 | | 9/2018 | |
| KR | 20180101734 | A * | 9/2018 | E06C 7/02 |
| WO | WO-2011087385 | A2 * | 7/2011 | E04F 11/064 |
| WO | 2017174877 | | 10/2017 | |
| WO | WO-2017174877 | A1 * | 10/2017 | E04G 1/22 |

* cited by examiner

DETAIL A

DETAIL B

EXTENSION LADDER

CROSS-REFERENCE TO RELATED APPLICATIONS

This is a nonprovisional of U.S. provisional patent application Ser. Nos. 63/174,224 filed Apr. 13, 2021 and 63/055,249 filed Jul. 22, 2020, all of which are incorporated by reference herein.

FIELD

The present invention is related to extension ladders where the movement of the fly section relative to the base section is assisted with a force applicator. (As used herein, references to the "present invention" or "invention" relate to exemplary embodiments and not necessarily to every embodiment encompassed by the appended claims.) More specifically, the present invention is related to extension ladders with the movement of the fly section relative to the base section is assisted with a force applicator attached to the base rails of the base section and the fly rails of the fly section.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Extension ladders have a fly section that slides relative to a base section to extend the length of the extension ladder. Moving the fly section upwards requires the user to be able to lift the fly section. Similarly, when moving the fly section downwards, it requires the user to be able to control the fly section so the fly section does not come crashing down, possibly damaging the extension ladder. What is needed is to provide an assistance force that is part of the extension ladder itself which reduces the weight of the fly section to make it easier to lift the fly section, and separately, make it easier and safer to control the fly section when the fly section moves downwards relative to the base section.

BRIEF SUMMARY

The present invention pertains to an extension ladder. The extension ladder comprises a base section having a first base rail and a second base rail in parallel and spaced relationship with the first base rail and rungs attached to and between the first and second base rails. The extension ladder comprises a fly section having a first fly rail and a second fly rail in parallel and spaced relationship with the first fly rail and rungs attached to and between the first and second fly rails. The fly section is in sliding engagement with the base section. The extension ladder comprises a force applicator attached to the base section and the fly section which offsets some or all of the weight of the fly section.

The present invention pertains to a method for using an extension ladder. The method comprises the steps of extending a fly section of the extension ladder relative to a base section of the extension ladder. There is the step of leaning the fly section against an object. There is the step of sliding the fly section downwards relative to the base section while a force applicator attached to the fly section and the base section applies a counterbalancing force to the fly section to effectively reduce a weight of the fly section.

The present invention pertains to a method for manufacturing an extension ladder. The method comprises the steps of attaching a cable anchor to a first fly rail of a fly section of the extension ladder. There is the step of attaching a spring assembly to a first base rail of a base section of the extension ladder, the fly section slidingly attached to the base section. There is the step of attaching an end of a cable which extends from the spring assembly to the cable anchor.

The present invention pertains to a method for using an extension ladder. The method comprises the steps of extending a fly section of the extension ladder relative to a base section of the extension ladder. There is the step of leaning the fly section against an object. There is the step of sliding the fly section downwards relative to the base section while a force applicator attached to the fly section and the base section applies a counterbalancing force from a motor engaged with the force applicator to effectively reduce a weight of the fly section.

DETAILED DESCRIPTION OF THE INVENTION

Figure 1:
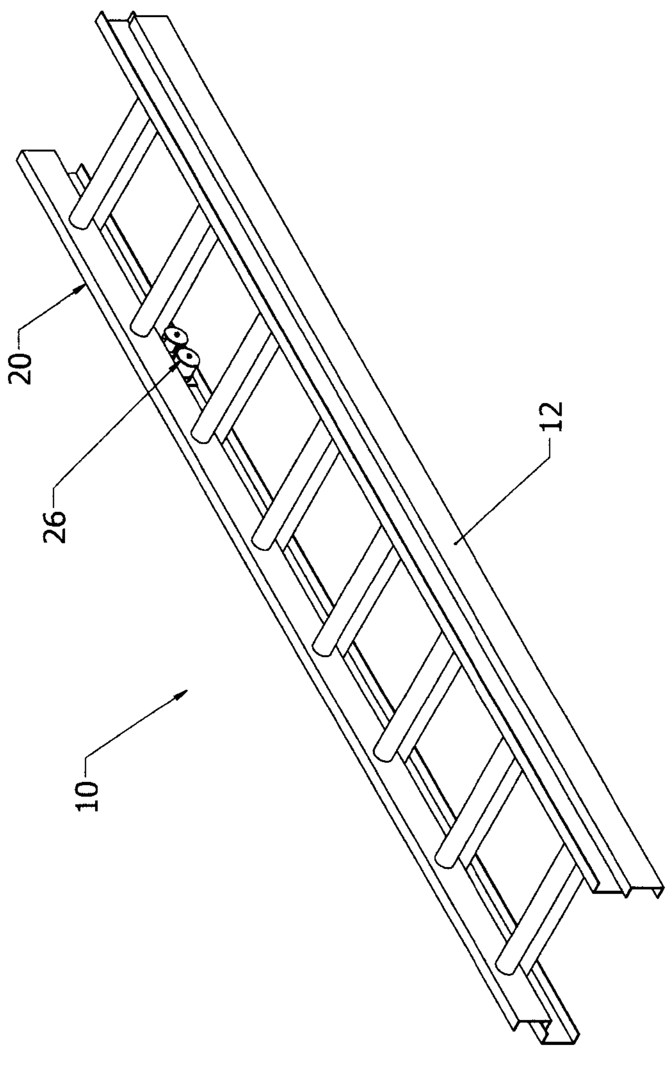
FIG. 1 is a perspective view of the present invention with the fly section retracted over the base section of the extension ladder.
Figure 2:
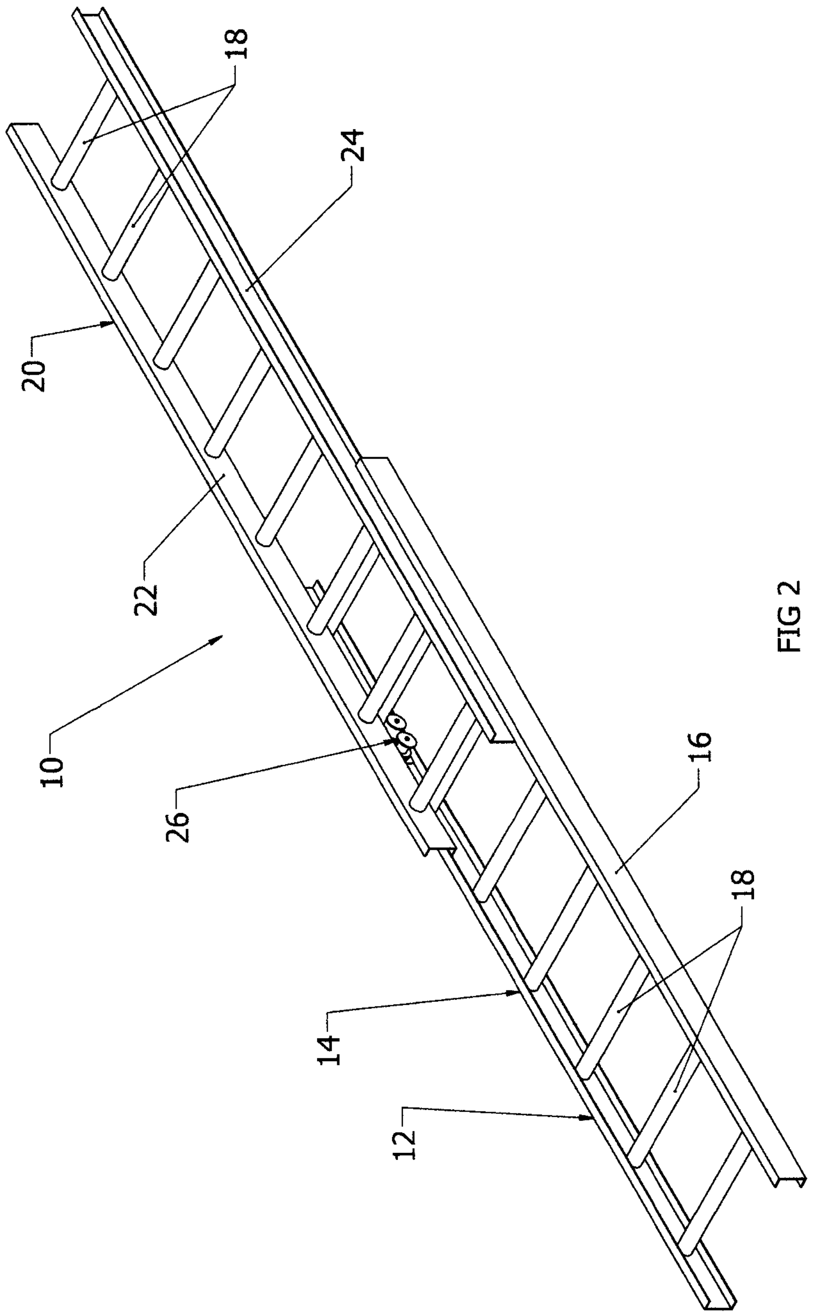
FIG. 2 is a perspective view of the fly section extended from the base section.
Figure 4:
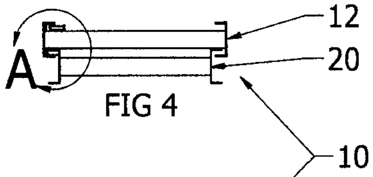
FIG. 4 is an overhead view of the extension ladder.
Figure 3:
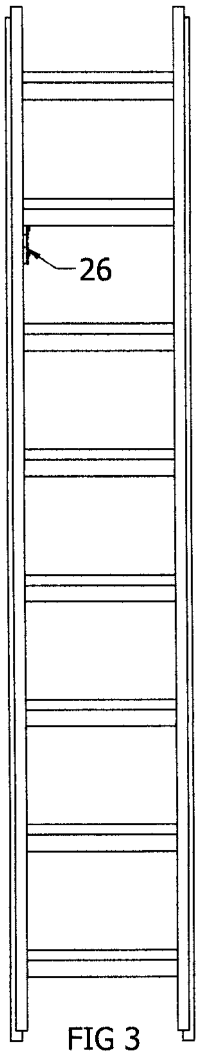
FIG. 3 is a front view of the extension ladder of the present invention.

Referring now to the drawings wherein like reference numerals refer to similar or identical parts throughout the several views, and more specifically to FIGS. 1, 2 and 11-13 thereof, there is shown an extension ladder 10. The extension ladder 10 comprises a base section 12 having a first base rail 14 and a second base rail 16 in parallel and spaced relationship with the first base rail 14 and rungs 18 attached to and between the first and second base rails 14, 16. The extension ladder 10 comprises a fly section 20 having a first fly rail 22 and a second fly rail 24 in parallel and spaced relationship with the first fly rail 22 and rungs 18 attached to and between the first and second fly rails 22, 24. The fly section 20 is in sliding engagement with the base section 12. The extension ladder 10 comprises a force applicator 26 attached to the base section 12 and the fly section 20 which offsets some or all weight of the fly section 20.

The force applicator 26 may offset at least 30% of the weight of the fly section 20. The force applicator 26 may include a spring assembly 30 attached to the first base rail 14 and a cable 32 extending from the spring assembly 30 and attached to the first fly rail 22. As the first fly rail 22 slides relative to the first base rail 14, the cable 32 moves relative to the spring assembly 30 and the spring assembly 30 applies a spring force through the cable 32 to the first fly rail 22. The spring force may counterbalance the weight of the fly section 20 through the cable 32 when the fly section 20 is slid upwards relative to the base section 12, making it easier for a user to slide the fly section 20 upwards relative to the base section 12.

The spring force may counterbalance the weight of the fly section 20 through the cable 32 when the fly section 20 is slid downwards, making it easier for the user to slide the fly section 20 downwards relative to the base section 12. External guides 17 at the top of the base section 12 may securely interlock the first and second base rails 14, 16 with the first and second fly rails 22, 24, respectively. There is a center pulley 28 attached to one of the rungs 18 of the base rail through which a rope 27 extends, and a rope clamp 25 attached to one of the rungs 18 of the fly rail to attach the rope 27 to the fly section 20 so when a free end of the rope 27 that has passed through the center pulley 28, is pulled by the user, the fly section 20 slides upwards relative to the base section 12, and when the fly section 20 is moved downwards relative to the base section 12, the free end of the rope 27 can be held by the user to slow down and control the descent of the fly section 20. The force applicator 26 further assists the movement of the fly section 20 relative to the base section 12 by counterbalancing the weight of the fly section 20 so less force is necessary to pull on the rope 27 to slide the fly section 20 upwards against the action of gravity relative to the base section 12 compared to when the force applicator 26 is not present. Similarly, the force applicator 26 further assists the movement of the fly section 20 relative to the base section 12 by counterbalancing the weight of the fly section 20 so less force is necessary to hold on to the rope 27 and let the rope 27 move through the hands of the user as the fly section 20 slides down under the action of gravity relative to the base section 12 compared to when the force applicator 26 is not present. Internal guides on the bottom of the fly section 20 securely interlock the first and second base rails 14, 16 with the first and second fly rails 22, 24, respectively. Locks 21 on the fly section 20 securely hold the fly section 20 to the base section 12 at a desired position. In all the embodiments described herein of the force applicator 26 with the ladder 10, preferably there is present on the ladder 10 a center pulley 28 and a rope 27 to assist the user in moving the fly section 20, although the center pulley 28 and the rope 27 are not necessary. The center pulley 28 and the rope 27 are completely separate and apart from the force applicator 26. They do not interfere with each other. The operation of the force applicator 26 to move the fly section 20 relative to the base section 12 assists with the operation of the rope 27 and center pulley 28 and vice versa, but the force applicator 26 does not need the presence of a rope 27 and pulley 28, and the rope 27 and pulley 28 does not need the presence of the force applicator 26 to operate.

The spring assembly 30 may include an output spool 120 and a storage spool 122 disposed adjacent the output spool 120, and a power spring 124 positioned about the output spool 120 and the storage spool 122 and extending therebetween. See FIGS. 15-22. As the cable 32 is extended from the spring assembly 30, the output spool 120 rotates causing the power spring 124 on the storage spool 122 to be pulled over to the output spool 120 and wrap around the output spool 120, with the power spring 124 on the storage spool 122 producing a resistive force which serves to counterbalance the weight of the fly section 20 through the cable 32. As the cable 32 is retracted to the spring assembly 30, the power spring 124 on the output spool 120 is caused to be pulled over to the storage spool 122 with the power spring 124 on the storage spool 122 producing a retractive force which serves to counterbalance the weight of the fly section 20 through the cable 32 and retract the cable 32.

The spring assembly 30 may include a drum portion 132 positioned below the output spool 120 and attached to the output spool 120 in between the output spool 120 and the first fly rail 22. The cable 32 wraps about the drum portion 132. As the cable 32 extends from the drum portion 132 when the first fly rail 22 slides downwards relative to the first base rail 14, the cable 32 rotates the drum portion 132 which in turn rotates the output spool 120 causing the power spring 124 on the storage spool 122 to move to the output spool 120 and apply the resistive force to the cable 32. As the cable 32 is retracted to the drum portion 132 when the first fly rail 22 slides upwards, the power spring 124 on the storage spool 122 pulls back the power spring 124 on the output spool 120, applying the retractive force and causing the output spool 120 and thus the drum portion 132 to rotate and retract the cable 32 to the drum portion 132. The spring assembly 30 may include a roller 19 adjacent the output spool 120 over which the cable 32 extends from the output spool 120. The roller 19 serves to assist the proper movement of the cable 32 to and from the drum portion 132, and avoid the cable 32 from tangling and guiding the cable 32 to the proper position. The drum portion 132 and the output spool 120, and the storage spool 122 may extend from rods 134 that extend from a foundation 144 which attaches to the first base rail 14, preferably on the inside of the web 52 of the first base rail 14. The roller 19 may extend from a corner of the foundation 144 in parallel with the rods 134 that extend from the foundation 144.

Figure 7:
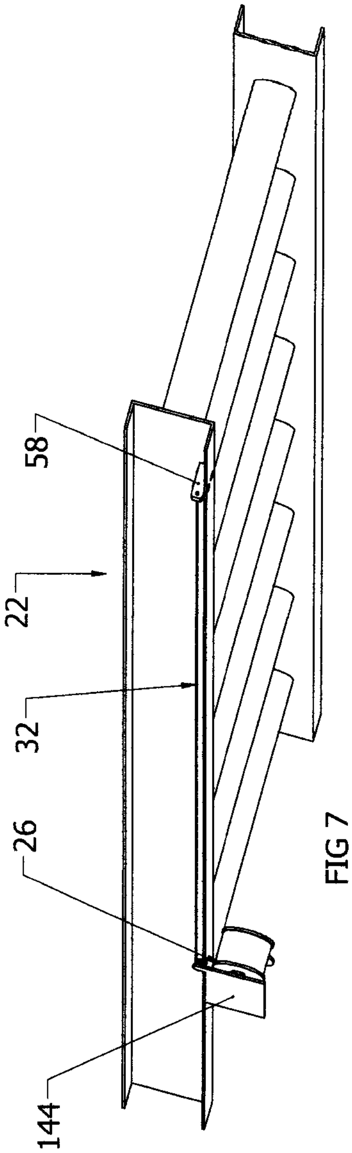
FIG. 7 is an underside view of the fly section retracted and the base section hidden except for the spring assembly.
Figure 9:
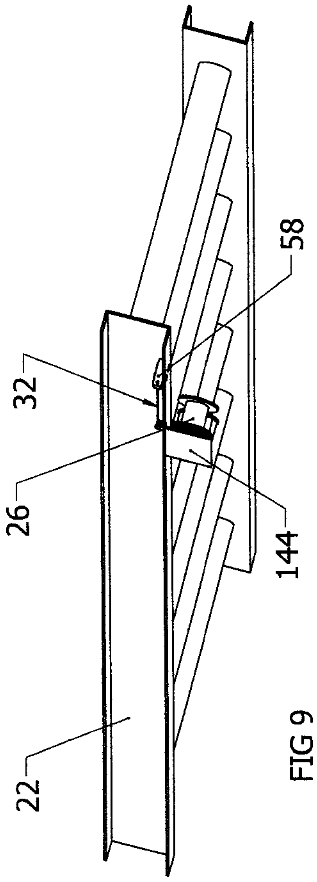
FIG. 9 is an underside view of the fly section extended in the base section hidden except for the spring assembly.
Figure 10:
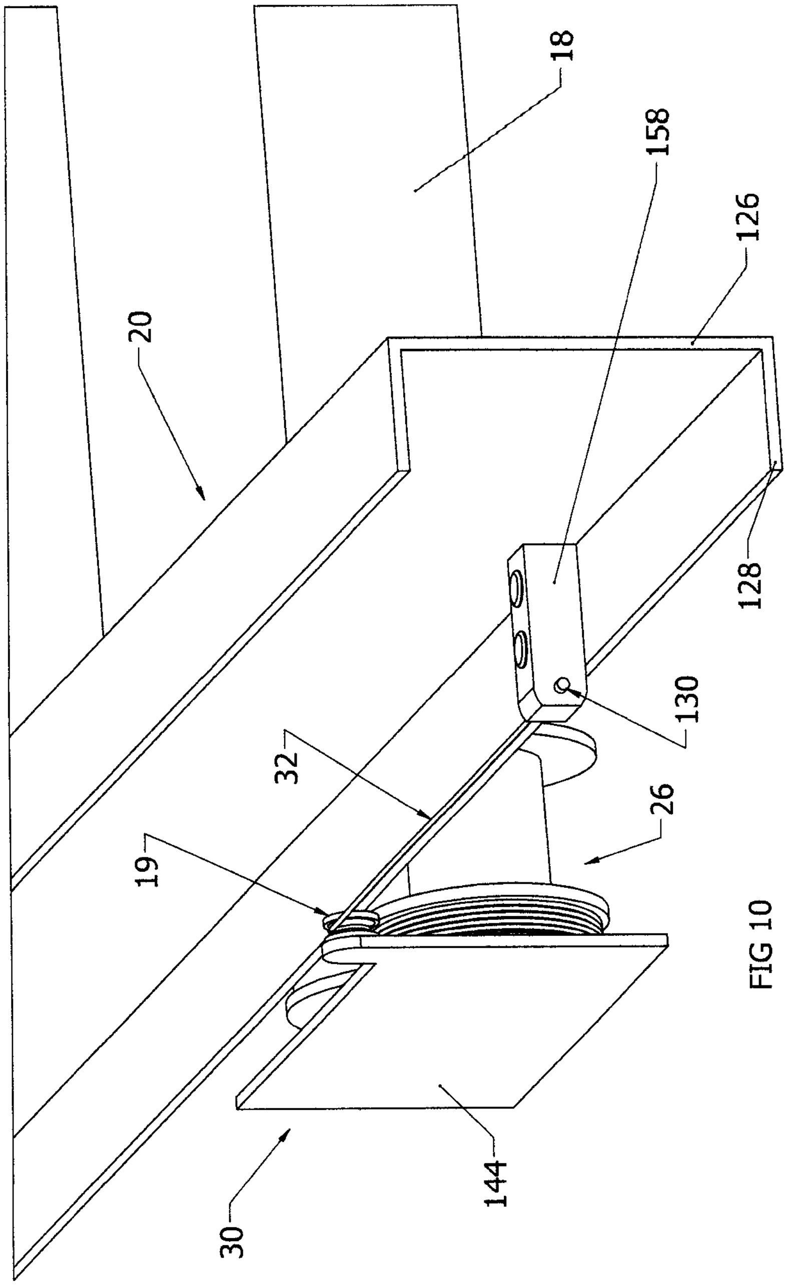
FIG. 10 is an enlarged perspective view of the cable anchor riveted to a fly rail with the base section hidden except for the spring assembly.
Figure 11:
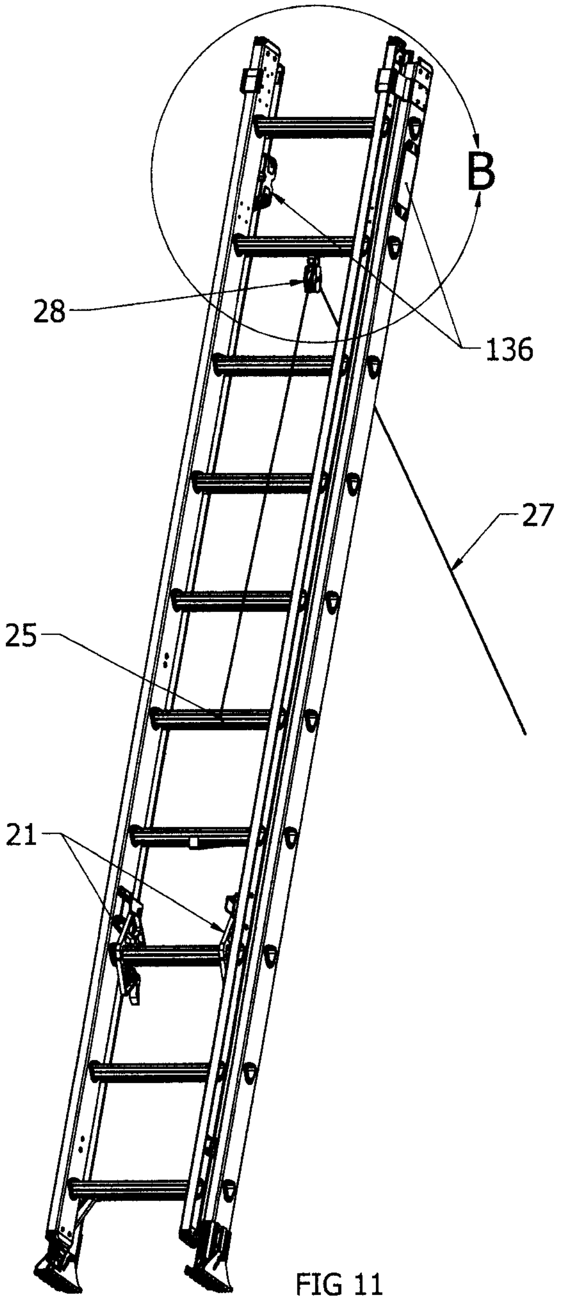
FIG. 11 is a perspective view of the extension ladder in the retracted position.
Figure 12:
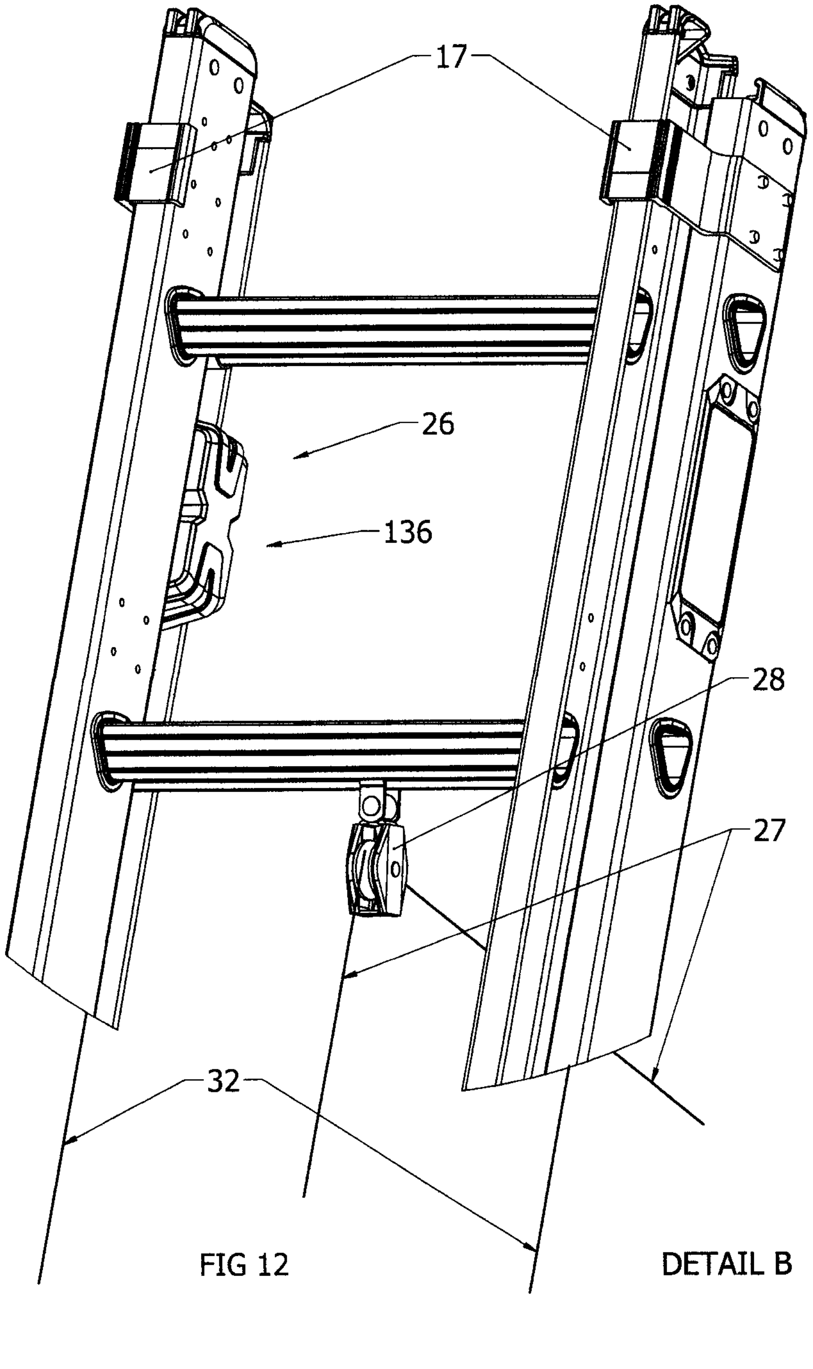
FIG. 12 is an enlarged view of section B of FIG. 11.
Figure 13:
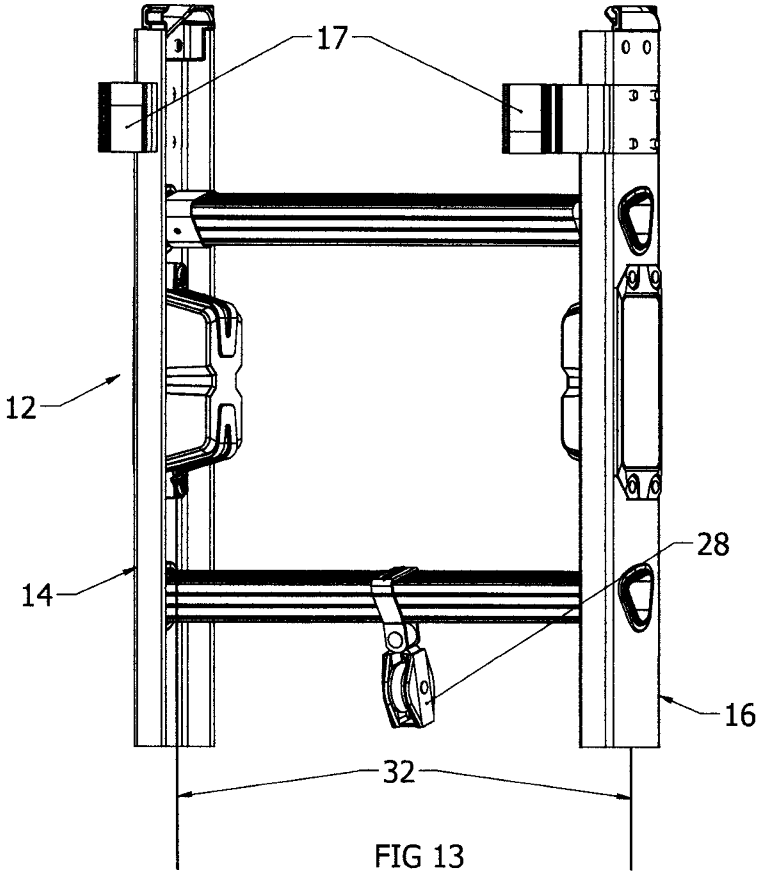
FIG. 13 is a perspective view of a top portion of the base section.
Figure 14:
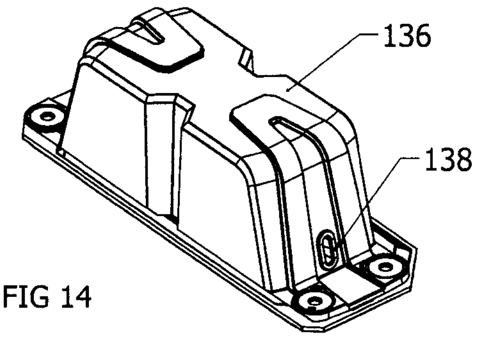
FIG. 14 is a perspective view of a spring housing.
Figure 15:
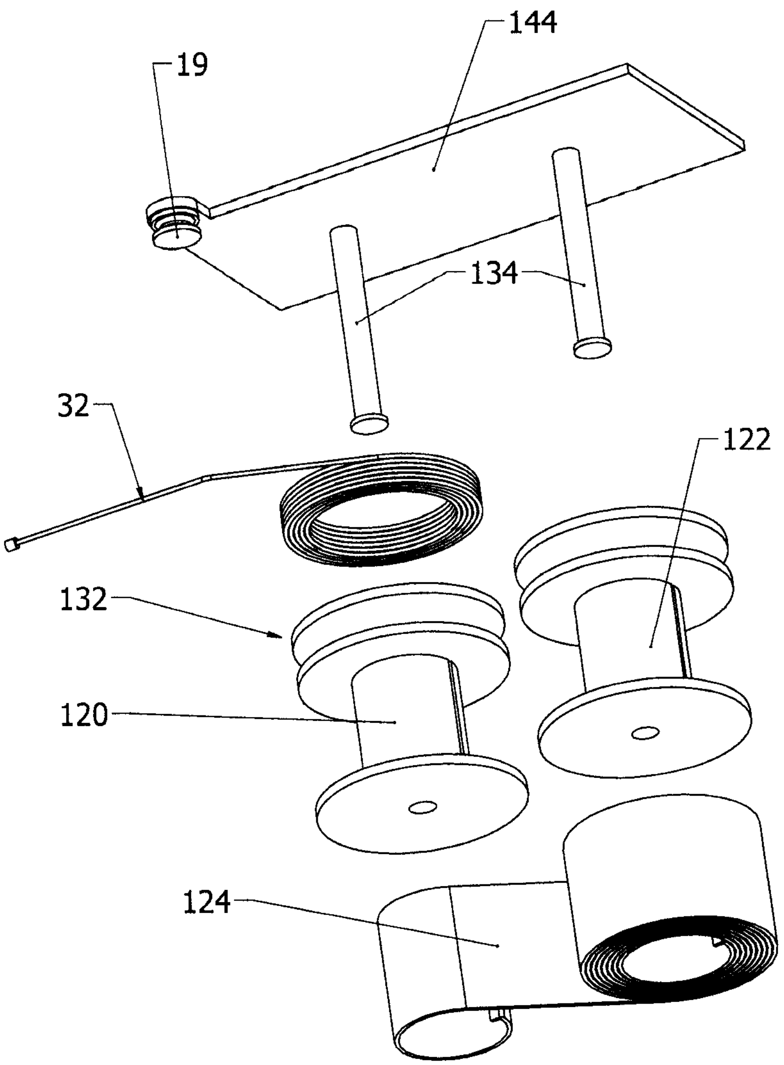
FIG. 15 is an exploded view of a spring assembly.
Figure 19:
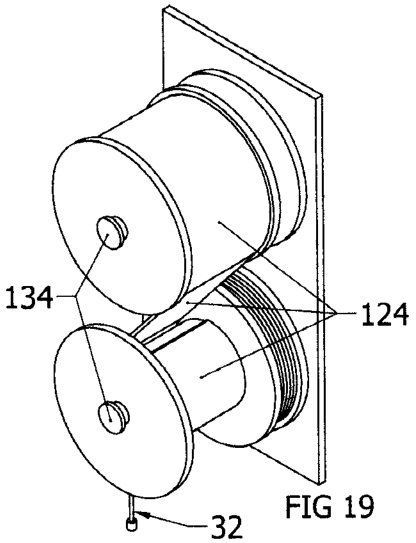
FIG. 19 is a perspective view of the spring assembly.
Figure 20:
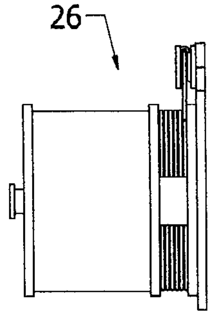
FIG. 20 is an end view of the spring.
Figure 16:
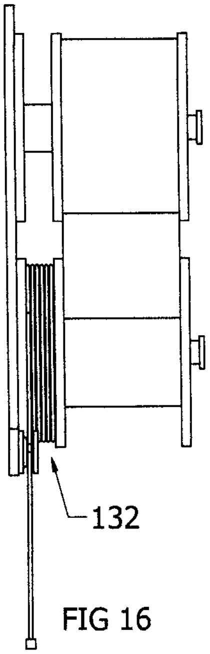
FIG. 16 is an underside view of the spring assembly.
Figure 17:
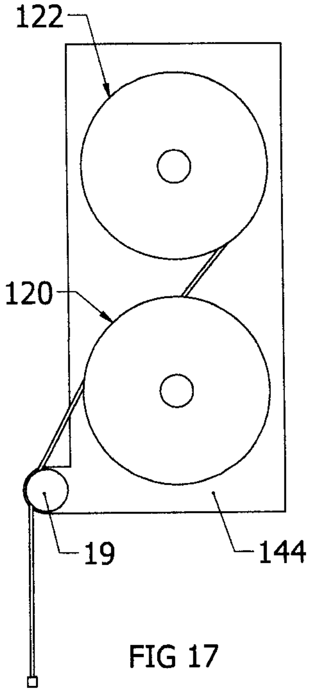
FIG. 17 is a side view of the spring assembly.
Figure 18:
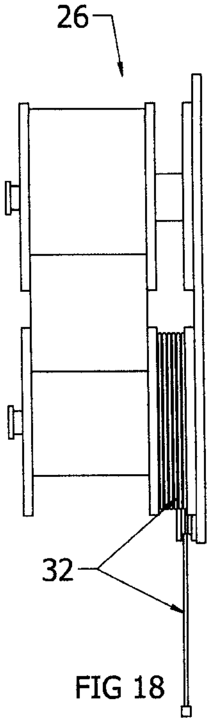
FIG. 18 is an overhead view of the spring assembly.
Figure 21:
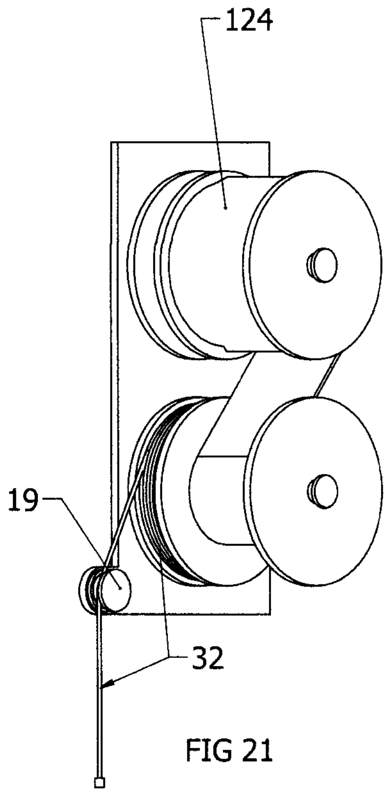
FIG. 21 shows the spring assembly and a retracted position.
Figure 22:
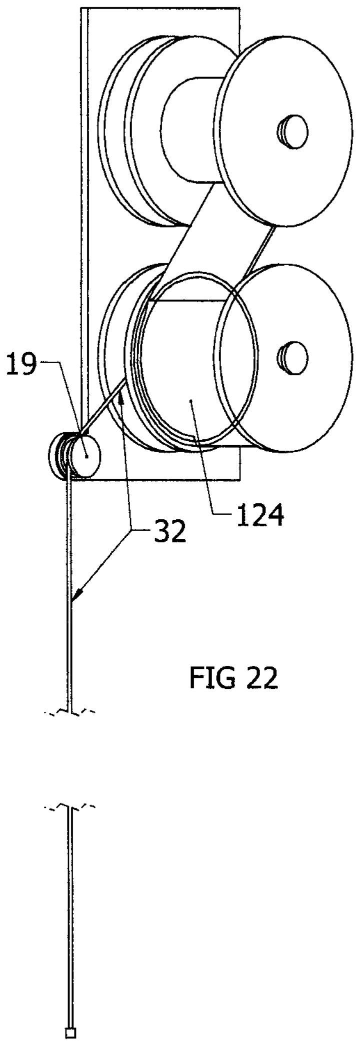
FIG. 22 shows the spring assembly in the extended position.

The spring assembly 30 may include a housing 136, as shown in FIG. 14, in which the drum portion 132, the output spool 120, the roller 19 and the storage spool 122 are disposed. The housing 136 having an opening 138 through which the cable 32 extends to the first fly rail 22. The housing 136 with the spring assembly 30 and the cable 32 may be attached to a web 52 of the first base rail 14, as shown in FIGS. 11, 12 and 13. The cable 32 extending from the housing 136 to the first fly rail 22 along the web 126 of the first fly rail 22. The extension ladder 10 may include a cable 32 anchor attached to the first fly rail 22, as shown in FIGS. 7, 9 and 10. The force applicator 26 may also include a housing 136 with a spring assembly 30 and a cable 32 and a cable 32 anchor attached to the second base rail 16 and second fly rail 24 in the same way as described above with respect to the first base rail 14 and the first fly rail 22. Preferably, the cable anchor 58 is attached adjacent the bottom of the first fly rail 22 on the inside of the web 126 of the first fly rail 22, and the housing 136 with the spring assembly 30 attached adjacent the top of the first fly rail 22 on the inside of the web 52 of the first base rail 14. The inside of the first base rail 14 and the inside of the first fly rail 22 face each other, as shown in FIG. 5.

The force applicator 26 makes extending the fly section 20 easier as well as making retracting the fly section 20 much safer. With the force applicator 26, a lower force is required to raise the fly section 20 relative to the base section 12, as compared to the absence of a force applicator 26. The force applicator 26 provides for a controlled/counter and balanced lowering of the fly section 20. The fly section 20 can be safely lowered by releasing the rope 27. The free end of the hoist rope 27 is contained and not contacting the ground.

Figure 5:
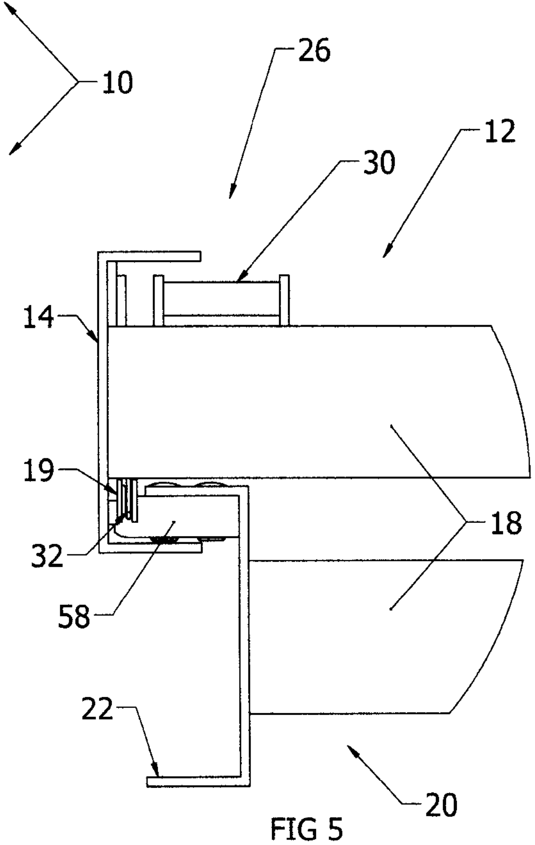
FIG. 5 is a close-up view of section A of FIG. 3.
Figure 6:
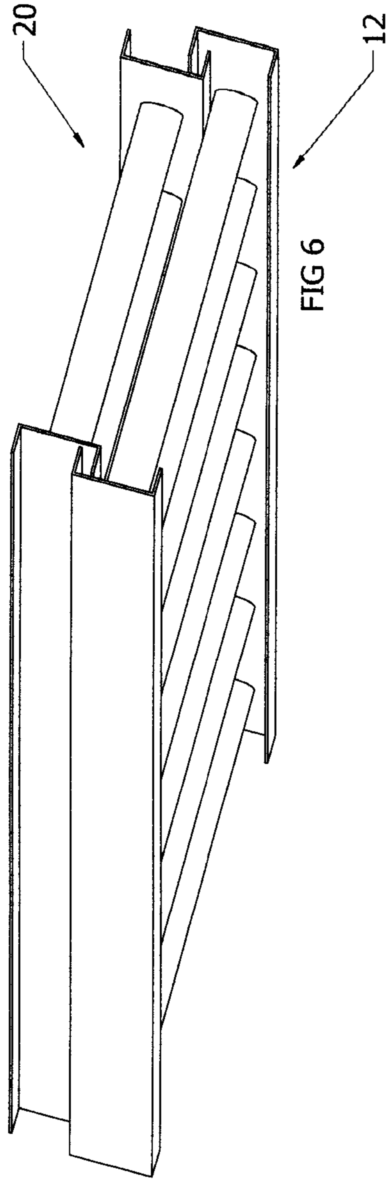
FIG. 6 is an underside perspective view of the fly section retracted over the base section.
Figure 8:
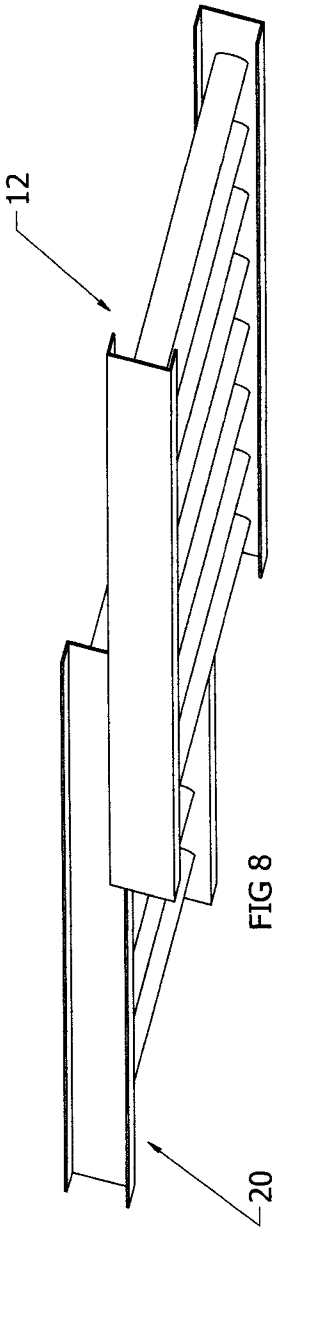
FIG. 8 is an underside view of the fly section extended from the base section.

FIG. 5 shows how the cable 32, after leaving the CTC spring assembly 30, is routed in the space between the first base rail 14 and first fly rail 22. FIGS. 7 and 9 show the cable 32 terminating at a cable anchor 58 which is attached to the fly rail. FIG. 10 shows that the cable anchor 58 is riveted to the flange 128 of the first fly rail 22. The end of the cable 32 passes through a hole in the cable anchor 58. A cable end 130 is swaged onto the end of the cable 32 to prevent the cable 32 from pulling back through the hole in the cable anchor 58. FIG. 6 shows the fly section 20 retracted with the base section 12 while FIG. 7 shows the fly section 20 retracted but without the base section 12. FIG. 8 shows the fly section 20 extended with the base section 12 while FIG. 9 shows the fly section 20 extended but without the base section 12.

Figure 23:
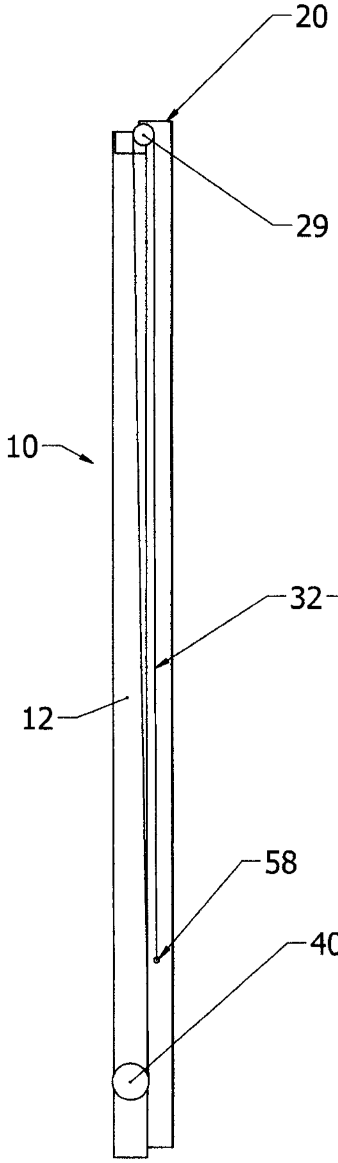
FIG. 23 shows the extension ladder in the retracted position having a torque drum.
Figure 24:
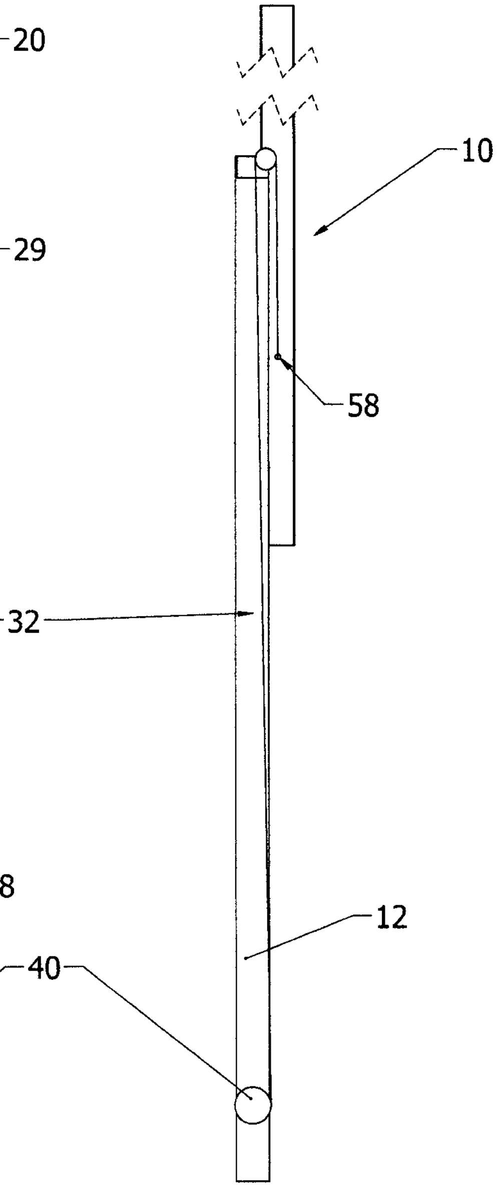
FIG. 24 shows the extension ladder in the extended position having a torque drum.
Figure 25:
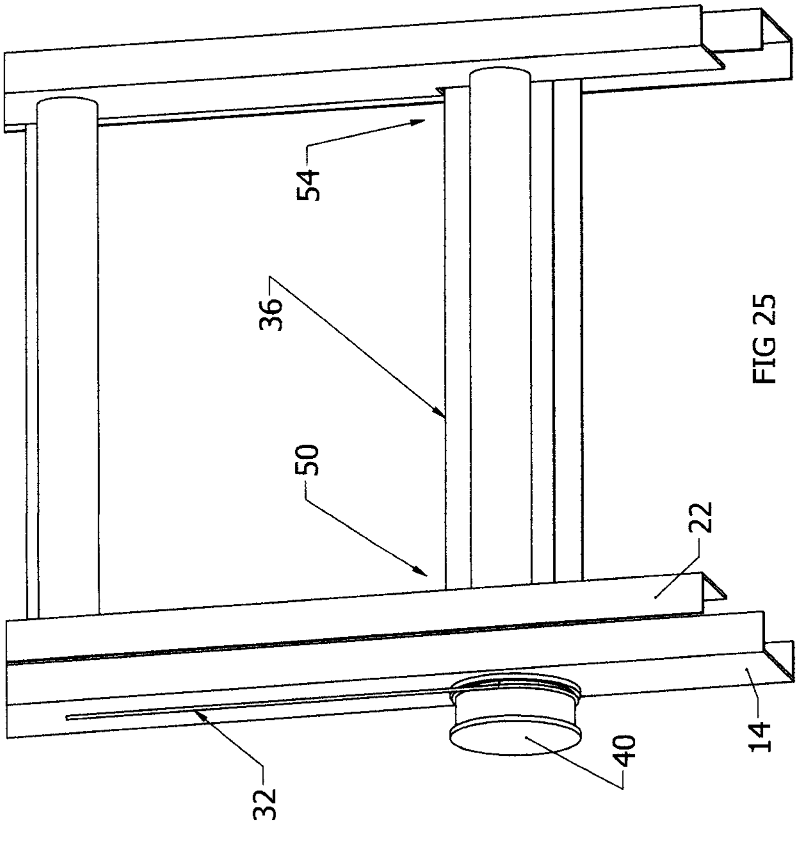
FIG. 25 shows a bottom portion of the extension ladder with a torque drum in a retracted position.
Figure 26:
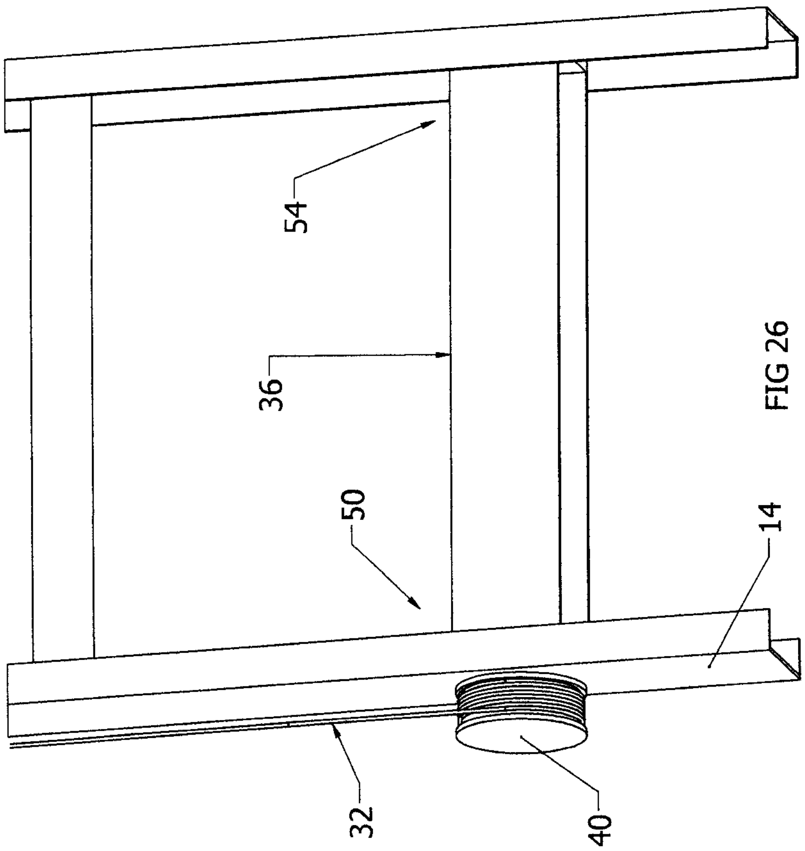
FIG. 26 shows a bottom portion of the extension ladder with a torque drum in an extended position.
Figure 27:
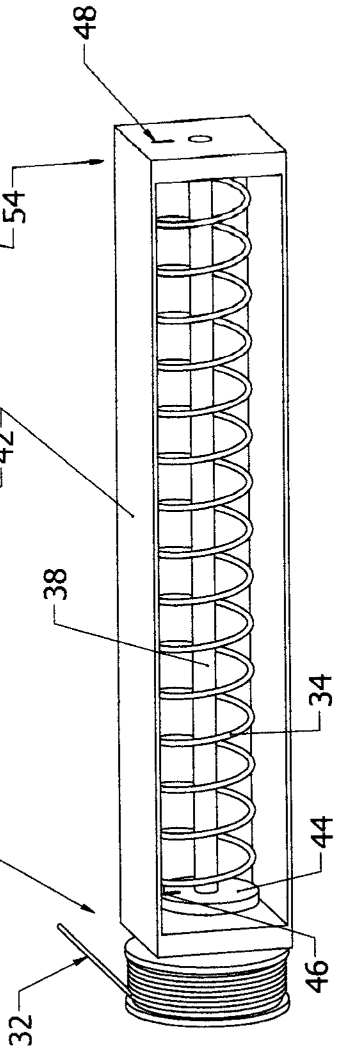
FIG. 27 shows the underside of a torque rung in an extended position.

FIG. 23 and FIG. 24 show a simplified extension ladder 10 in the retracted and extended positions respectively with an alternative embodiment of the force applicator 26 having a torque rung 36, shown in FIGS. 25 to 27. A cable 32 is shown mounted on the left side of the ladder 10. One end of the cable 32 is attached to a torque drum 40 of the force applicator 26. The cable 32 extends up to and passes around a base pulley 29 attached to the upper end of the base section 12. From there, the cable 32 extends down to a cable anchor 58 near the lower end of the first fly rail 22. FIG. 25 and FIG. 26 show how the cable 32 wraps around the torque drum 40. When the fly section 20 is retracted as in FIG. 25, the cable 32 has been mostly unwound from the torque drum 40. When the fly section 20 is extended as in FIG. 26, some amount of cable 32 has been wrapped around the torque drum 40. The cable 32 winds around the torque drum 40 because of the action of a torque spring 34 contained within the torque rung 36. It is the tension in the cable 32 which partially offsets the weight of the fly section 20.

Figure 28:
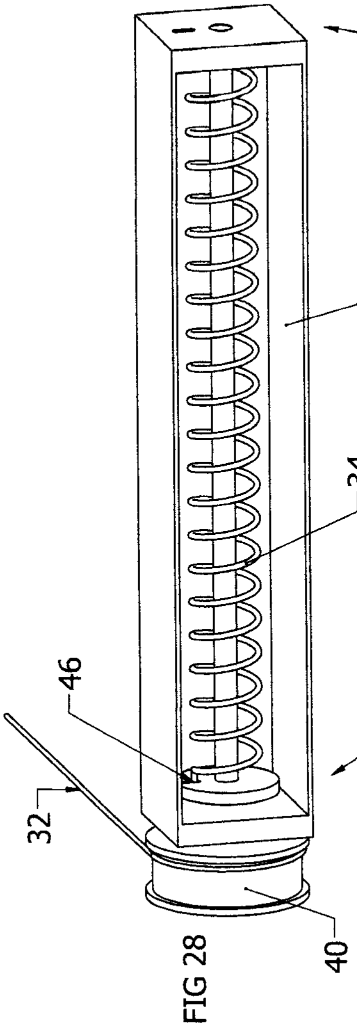
FIG. 28 shows the underside of the torque rung in a retracted position.

FIG. 27 and FIG. 28 show the construction and the function of the torque rung 36. A torque spring 34 is mounted around a torque shaft 38. The first end 46 of the torque spring 34 is fixed to a torque shaft flange 44 which is connected to the torque shaft 38 and rotates with the torque shaft 38. A second end 48 of the torque spring 34 is fixed to the torque rung 36 body 42. The torque shaft 38 extends and is connected to the torque drum 40. As the torque drum 40 rotates, the torque shaft 38 rotates along with the torque shaft flange 44 and thus, the torque spring 34, whose first end 46 is fixed to the torque shaft flange 44, since the second end 48 of the torque spring 34 is fixed to the torque rung body 42. A first end 50 of the torque rung body 42 is attached to a web 52 of the first base rail 14 and a second end 54 of the torque rung body 42 is attached to a web 56 of the second base rail 16 with the web 52 of the first base rail 14 between the torque shaft flange 44 and the torque drum 40. The torque shaft 38 extends through the web 52 of the first base rail 14 from the torque drum 40 to the web 52 of the first base rail 14.

FIG. 27 shows the underside of a torque rung 36 in an extended configuration when the fly section 20 (now shown) is fully extended. Several turns of cable 32 are wrapped around the torque drum 40 and the torque spring 34 is exerting some amount of torsion on the torque drum 40. This torsion produces tension in the cable 32 which partially offsets the weight of the fly section 20. When the fly section 20 is moved to the retracted position, cable 32 is pulled from the torque drum 40 which causes the torque spring 34 to be wound up tighter, as seen in FIG. 28. Thus, depending on the spring rate of the torque spring 34 and its initial torsion when installed, some amount of the fly section 20 weight is offset by the cable 32 throughout the fly's range of motion.

With reference to FIGS. 29-34, the force applicator 26 may include a winch 62 attached to the base section 12, and a cable 32 attached to the winch 62 and the fly section 20. The fly section 20 is raised by the action of the winch 62 reeling in the cable 32. The winch 62 may include a winch frame 64 attached to the base rail, and a cable spool 66 mounted in the winch frame 64. The cable spool 66 has a portion 68 around which the cable 32 can wrap. Flanges 70 of the spool have gear teeth 72 which function as driven gears. A driving pinion 74 with gear teeth 72 is mounted in the winch frame 64. The driving pinion 74 engages the driven gears of the cable spool 66 so that rotating the driving pinion 74 CW causes the cable spool 66 to rotate CCW. The cable 32 is reeled in on the cable spool 66 when the driving pinion 74 is rotated CCW. A driving hex 76 connected to the driving pinion 74 extends up from the winch 62, the driving hex 76 engages a hex socket 78 which is held in a chuck 80 of a power drill 82.

Figure 29:
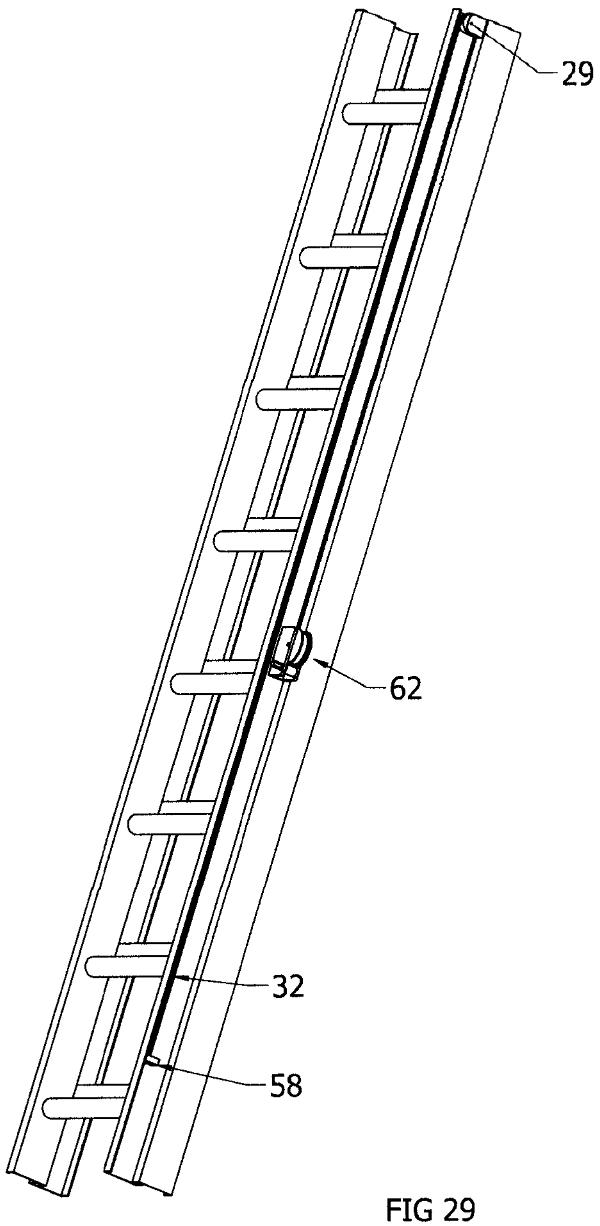
FIG. 29 is a perspective view of the extension ladder with a winch in a retracted position.
Figure 30:
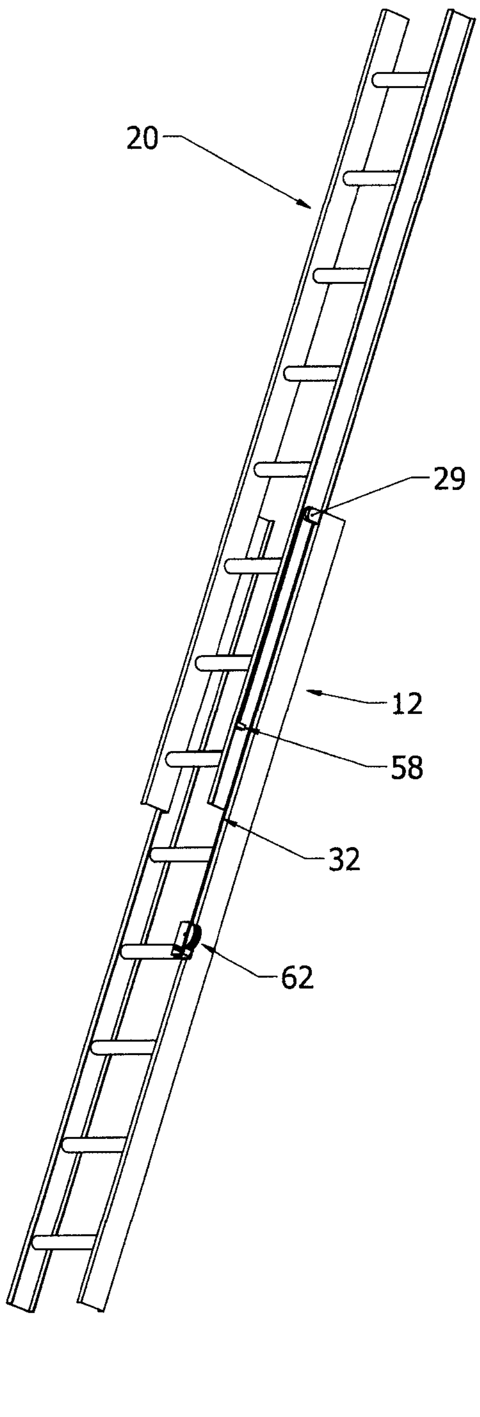
FIG. 30 is a perspective view of the extension ladder with a winch in an extended position.

FIGS. 29 and 30 show views of the ladder 10 with the fly section 20 retracted and with the fly section 20 extended. The winch 62 is attached to the base section 12. The base pulley 29 is attached to the upper end of the first base rail 14. A cable 32 extends from the winch 62, passes around the base pulley 29, and is anchored to the fly section 20 at the fly cable anchor. The fly section 20 is raised by the action of the winch 62 reeling in the cable 32.

Figures 31, 32:
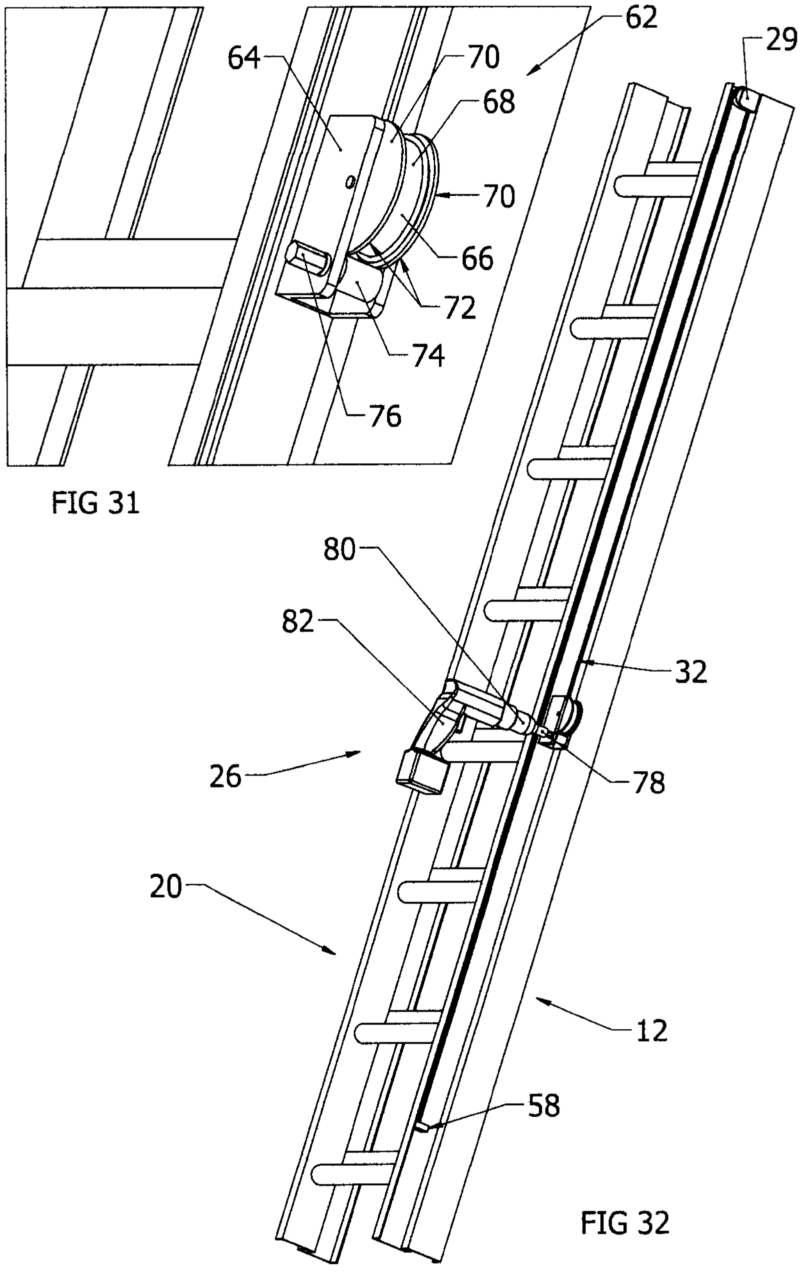
FIG. 31 shows a winch attached to a first ladder rail.
FIG. 32 is a perspective view of the extension ladder in the retracted position having a winch with a power drill attached to the winch.

FIG. 31 shows the components of the winch 62. The winch frame 64 is attached to the first base rail 14. The cable spool 66 is mounted in the winch frame 64. The cable spool 66 has a portion 68 around which cable 32 can wrap. The flanges 70 of the spool have gear teeth 72 (not shown) so that they function as driven gears. A driving pinion 74 with gear teeth 72 (not shown) is mounted in the winch frame 64. The driving pinion 74 engages the driven gears of the cable spool 66 so that rotating the driving pinion 74 CW causes the cable spool 66 to rotate CCW. Cable 32 is reeled in on the cable spool 66 when it is rotated CCW. A driving hex 76 connected to the driving pinion 74 extends up from the winch 62. This driving hex 76 is designed to engage a hex socket 78 which is held in the chuck 80 of a power drill 82.

FIG. 32 shows a power drill 82 with a hex socket 78 in its chuck 80 engaged with the driving hex 76 of the winch 62. Running the power drill 82 in the CW direction would reel in the cable 32 and so cause the fly section 20 to be extended.

Figure 33B:
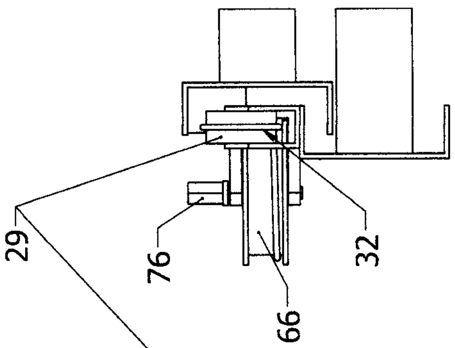
FIG. 33B is an overhead view of the extension ladder with a winch in the retracted position.
Figure 33A:
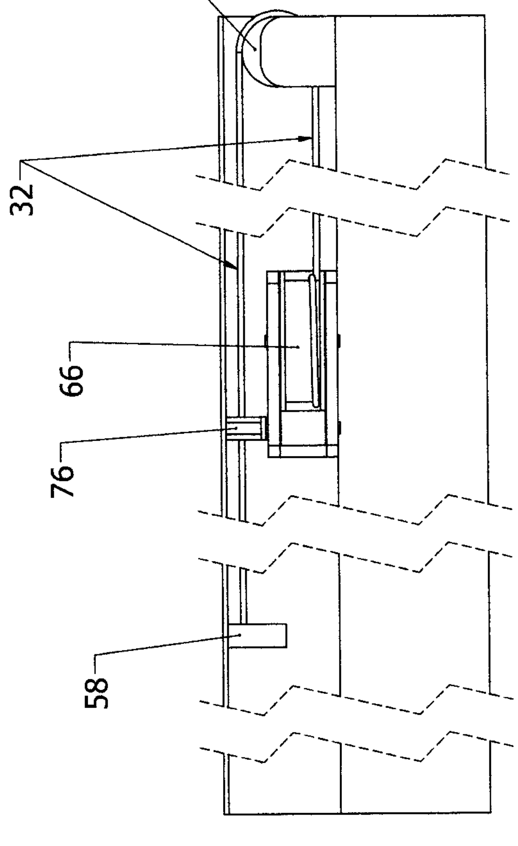
FIG. 33A is a side view of a portion of the extension ladder with a winch in the retracted position.

FIGS. 33A and 33B are broken views showing the path of the cable 32 when the fly section 20 is in its retracted position.

Figure 34B:
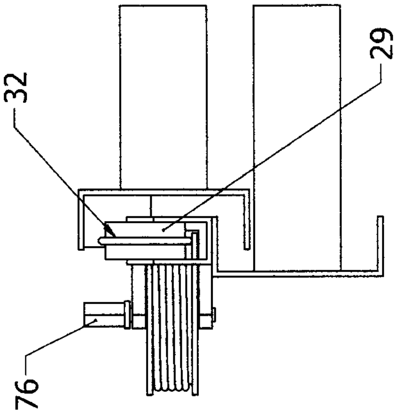
FIG. 34B is an overhead view of a portion of the extension ladder with a winch in the extended position.
Figure 34A:
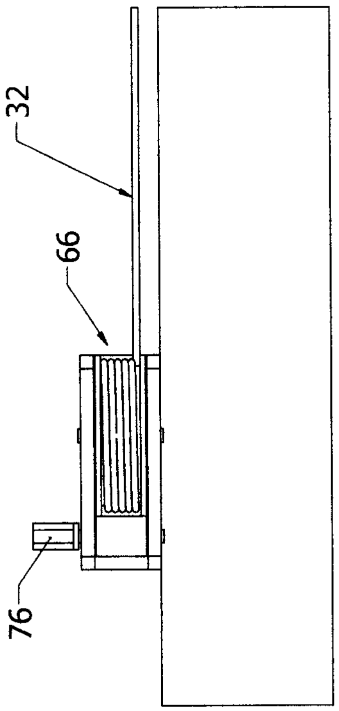
FIG. 34A is a side view of a portion of the extension ladder with a winch in the extended position.

FIGS. 34A and 34B show the winch 62 when the fly section 20 is in its extended position. Notice that cable 32 has wrapped around the cable spool 66.

Note, it is not intended that the winch 62 and cable 32 be used to hold the fly section 20 in position when the ladder 10 is in use. Conventional ladder locks (not shown) would be used. The purpose of the winch 62 and cable 32 is to enable a user to raise a ladder fly section 20 more easily by using a power drill 82. It is intended that when the power drill 82 is shut off or removed from the winch 62, the fly section 20 will descend by its own weight until its ladder locks properly engage a base rung, or it is fully retracted. Other types of motors to power the winch can be used other than a power drill 82. A power drill 82 is very convenient since it is commonly available when a ladder is used. Basically, any type of motor or generator, preferably portable, can be used to lift the fly section which has an interface to transfer the rotational force generated by the motor to the extension ladder to raise and/or lower the fly section 20. The interface can be the hex socket 78 attached to a driveshaft of a motor and in turn rotationally connected with the driving hex 76 of the ladder 10. Alternatively, there may be no cable but instead a rack on one of the fly rails of the fly section 20, which engages with a pinion on the base section 12, such as one of the base rails adjacent to one of the fly rails that has the rack. The motor effectively turns the pinion which lifts or lowers the fly section through the rack. The motor may be removably attached to the ladder 10 to cause the fly section 20 to be raised or lowered relative to the base section 12, and then completely separated from the ladder 10 when the motor is no longer needed so as not to add further weight to the ladder 10. Ideally, the motor is separate and apart from the ladder 10 so it does not contribute any weight to the ladder 10 and in weight to the ladder 10 when it is moved. Only when the ladder 10 is in position with the motor connected with the ladder to lift and/or lower the fly section 20 relative to the base section 12.

In another embodiment, the force applicator 26 may be a clock-work type power spring 124. A clock-work type power spring 124 produces torque on the shaft 150 which is connected to the drum 88. When the fly section 20 is fully retracted, the power spring 124 is wound most tightly. The power spring 124 unwinds (relaxes) as the fly section 20 moves toward the extended position. The power spring 124 is sized to apply torque on the drum 88 and so tension in the cable 32 and so partially offset the weight of the fly section 20 throughout the range of motion of the fly section 20.

Figure 35:
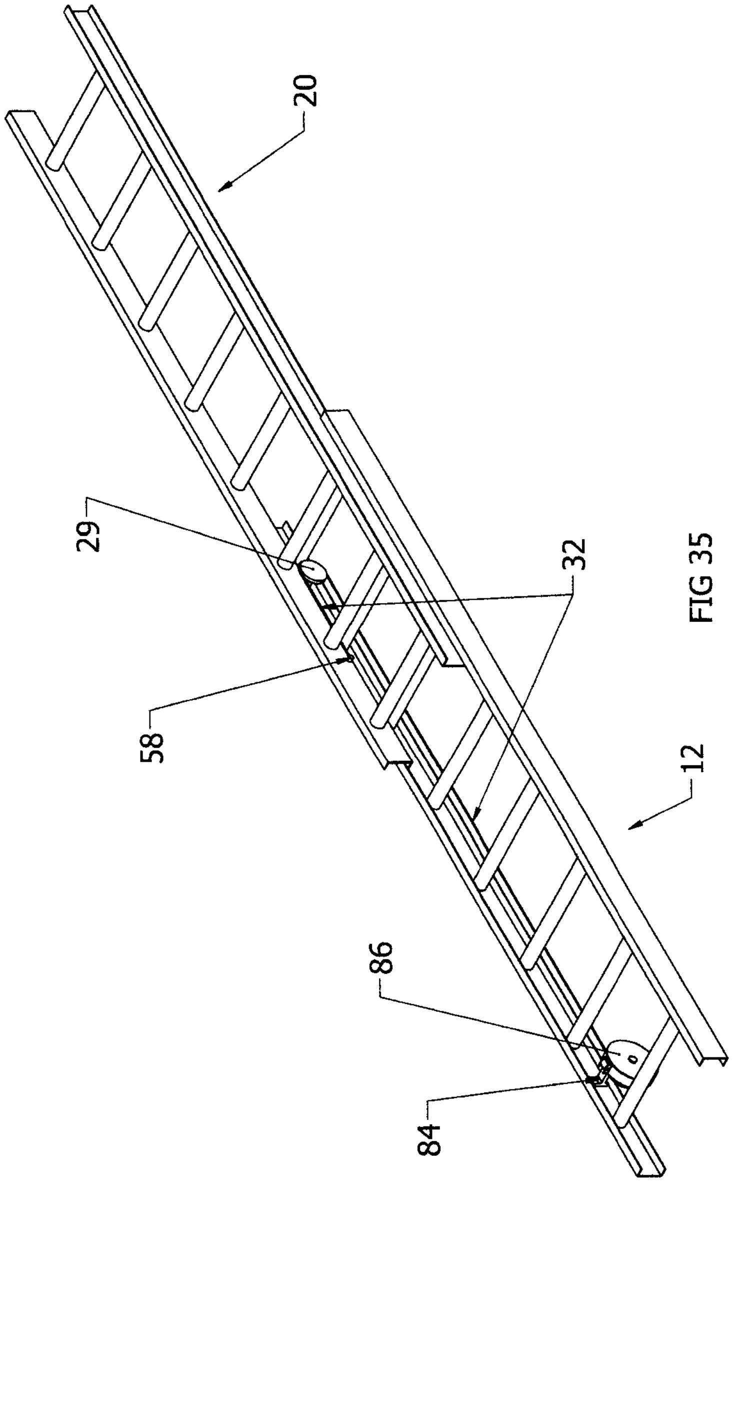
FIG. 35 is a perspective view of the extension ladder with a power spring unit in an extended position.
Figure 36:
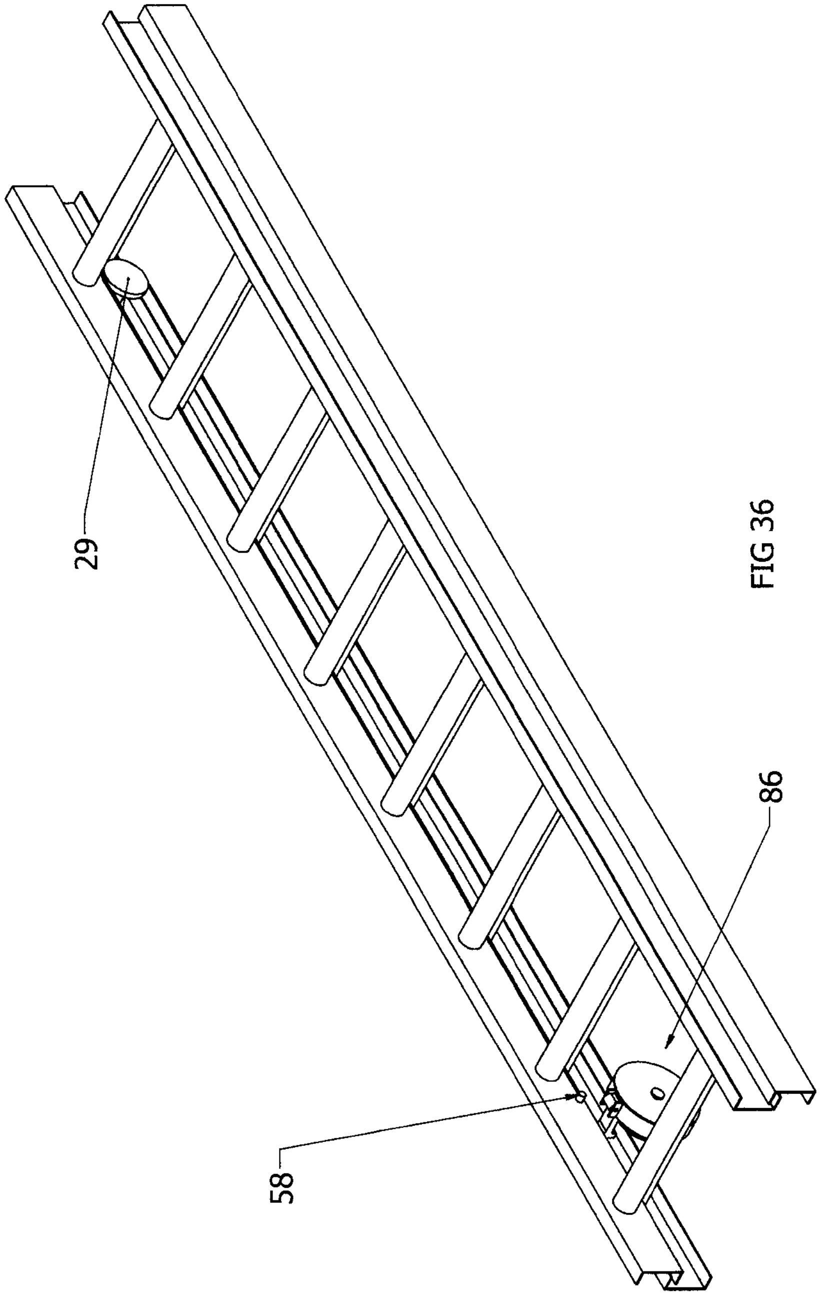
FIG. 36 is a perspective view of the extension ladder in a retracted position having a power spring unit.
Figure 37:
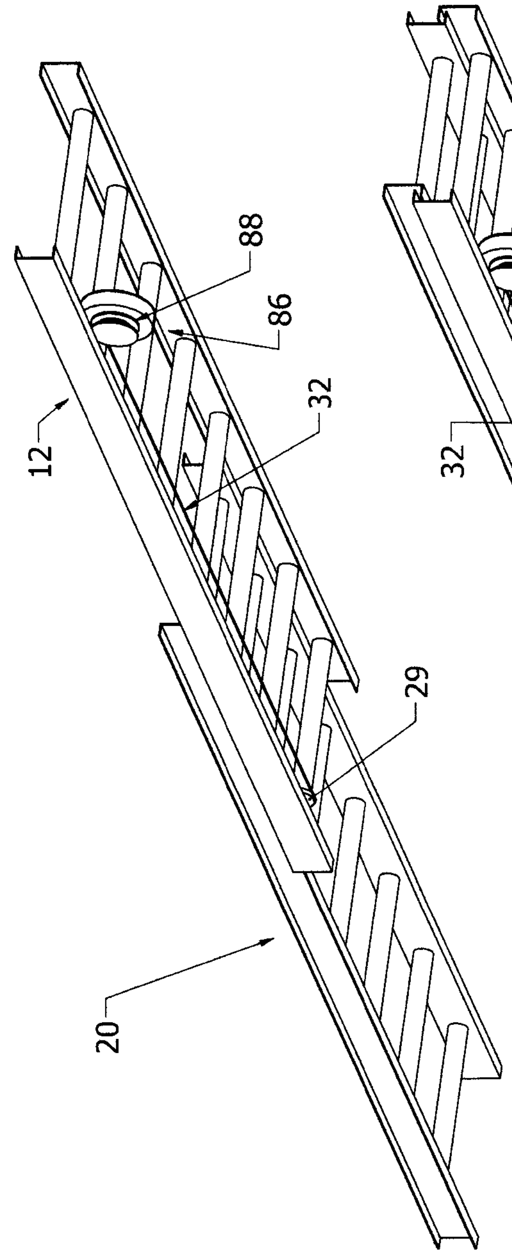
FIG. 37 is an underside perspective view of the extension ladder in an extended position having a power spring unit.
Figure 38:
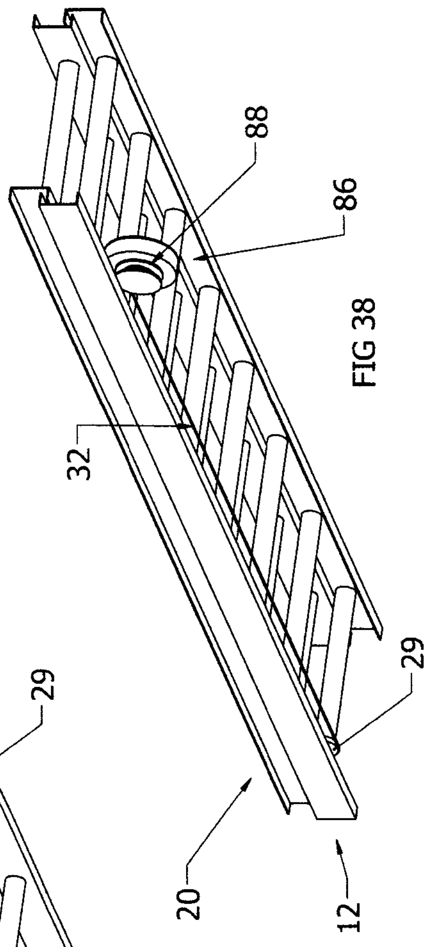
FIG. 38 is an underside perspective view of the extension ladder in a retracted position having a power spring unit.

FIGS. 35-38 show a simplified extension ladder 10 in the retracted and extended positions. The climbing side is seen in FIGS. 35 and 36 and the non-climbing side is in FIGS. 37 and 38. The major components of this invention are the power spring unit 86 which is connected to the first base rail 14 by a bracket 84, a pulley on the first base rail 14, a cable anchor 58 on the first fly rail 22, a drum 88 on the power spring unit 86, and the cable 32. One end of the cable 32 is fixed to and wraps around the drum 88. The cable 32 extends from the drum 88 to the pulley and then to the cable anchor 58 on the first fly rail 22. Tension produced in the cable 32 by the power spring unit 86 tends to make the fly section 20 move from the retracted to the extended position.

Figure 39:
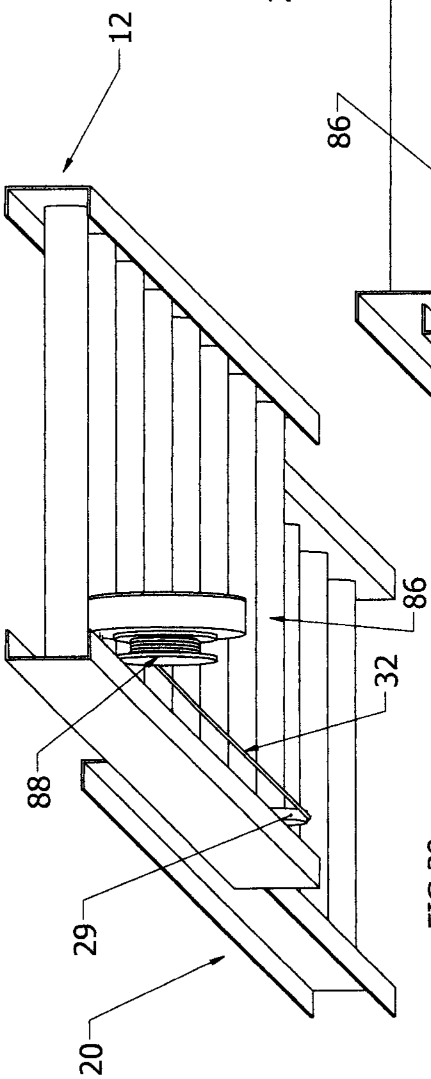
FIG. 39 is an underside perspective view of the power spring unit attached to the extension ladder in an extended position.
Figure 40:
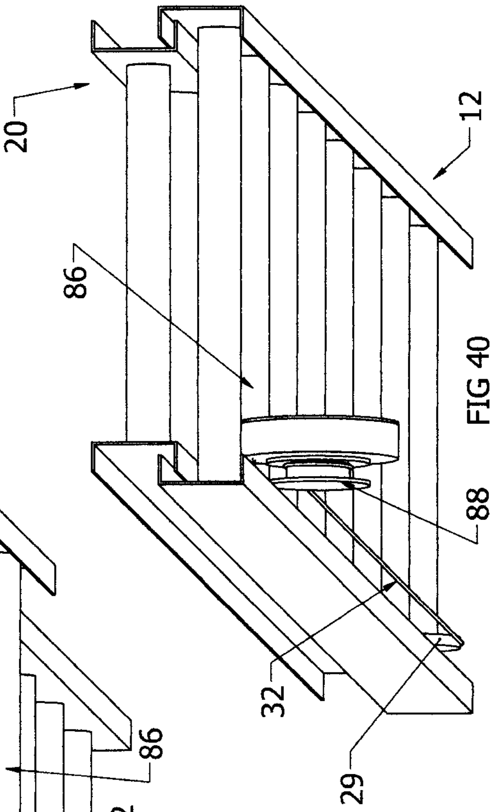
FIG. 40 is an underside perspective view of the power spring unit attached to the extension ladder in a retracted position.

FIG. 39 and FIG. 40 show how the cable 32 wraps around the drum 88. When the fly section 20 is extended as in FIG. 39, some amount of cable 32 is taken up by the drum 88. When the fly section 20 is retracted as in FIG. 40, nearly all of the cable 32 has been unwrapped from the drum 88.

Figure 42:
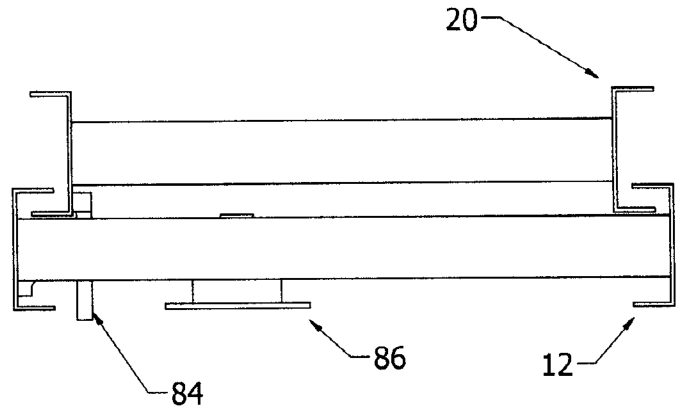
FIG. 42 is an overhead view of the extension ladder having a power spring unit in the stowed position.
Figure 41:
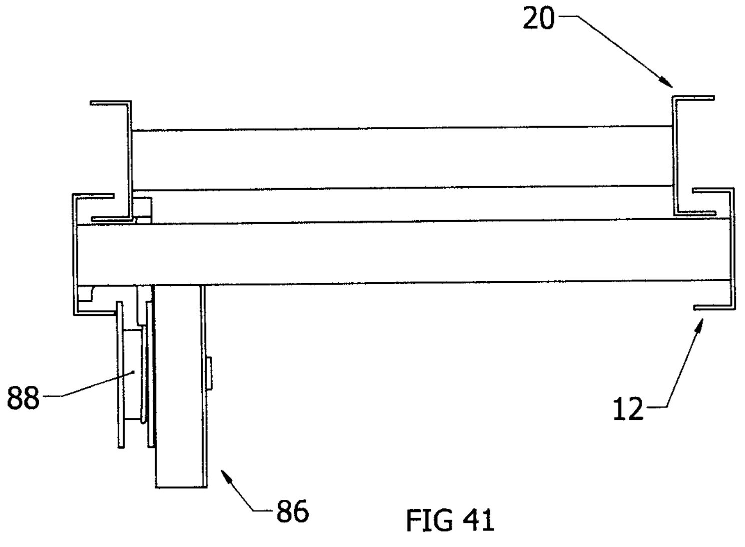
FIG. 41 is an overhead view of the extension ladder having a power spring unit in the deployed position.
Figures 43A, 43B:
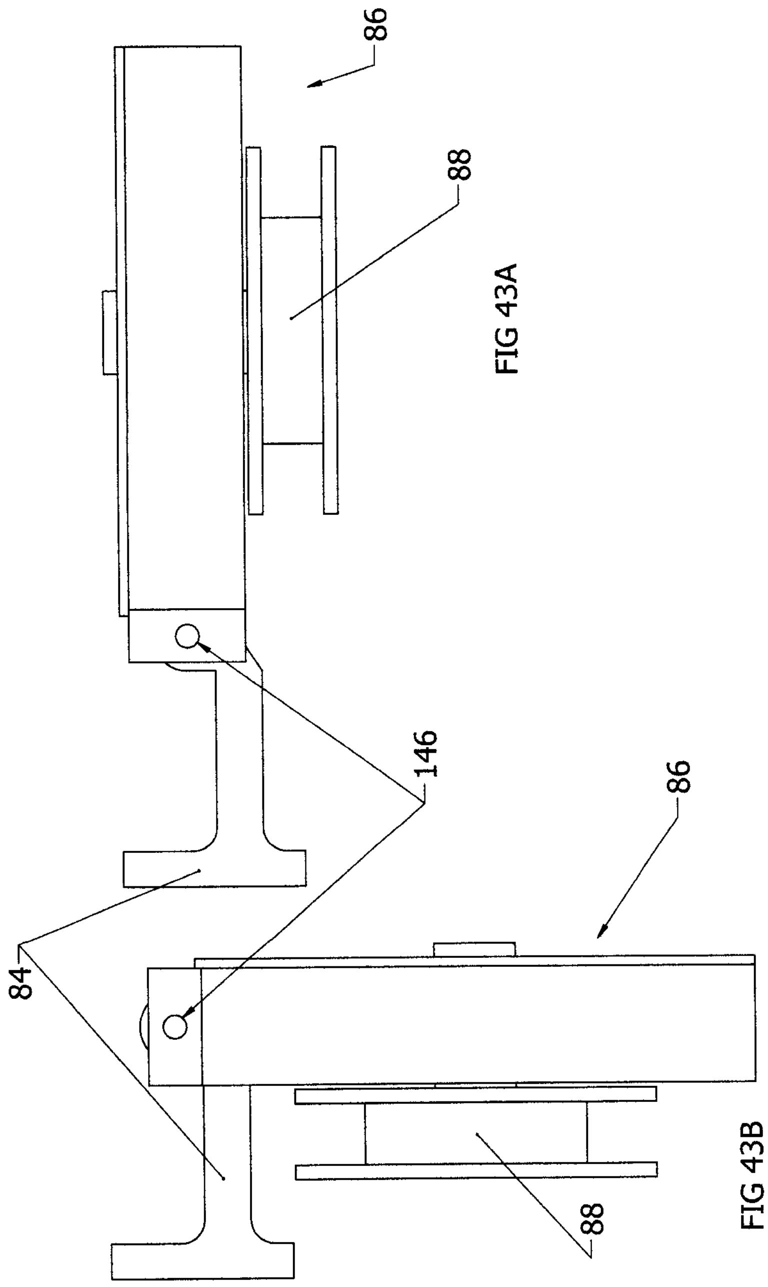
FIG. 43A shows the power spring unit in the stowed position.
FIG. 43B shows the power spring unit in the deployed position.

FIG. 41 and FIG. 42 show an additional feature of this invention. When the ladder 10 is in use, the power spring unit 86 is in the deployed position of FIG. 41, where the power spring unit 86 extends essentially perpendicular from the rungs 18. However, for transporting or storing the ladder 10, the power spring unit 86 can be moved into the stowed position of FIG. 42, where the power spring unit 86 is in line and parallel with the rungs 18. (The cable is not shown.) This stowing action is accomplished by the power spring unit 86 pivoting about the end of its bracket 84, as seen in FIGS. 43A and 43B. The bracket 84 is able to pivot about a pivot pin 146 between a deployed position where the drum 88 and power spring unit 86 extend perpendicularly from the base section 12 and a stowed position where the drum 88 and power spring unit 86 are parallel with the base section 12 for transporting or stowing the extension ladder 10.

Figure 44A:
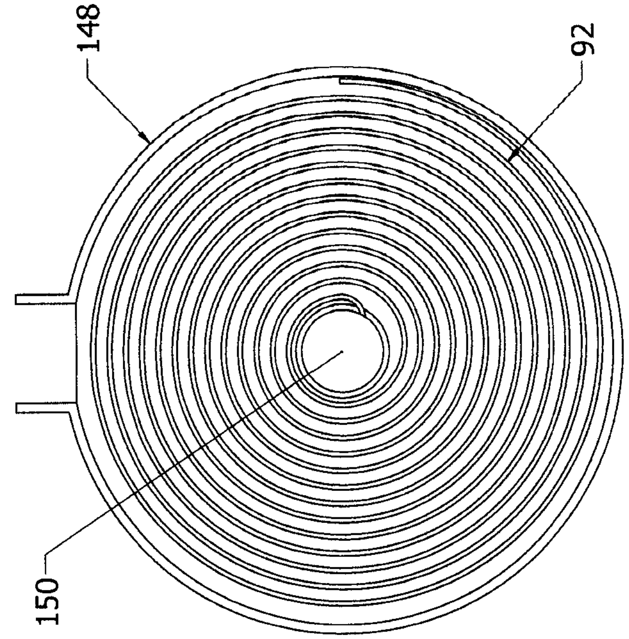
FIG. 44A is a cutaway side view of the power spring unit.
Figure 44B:
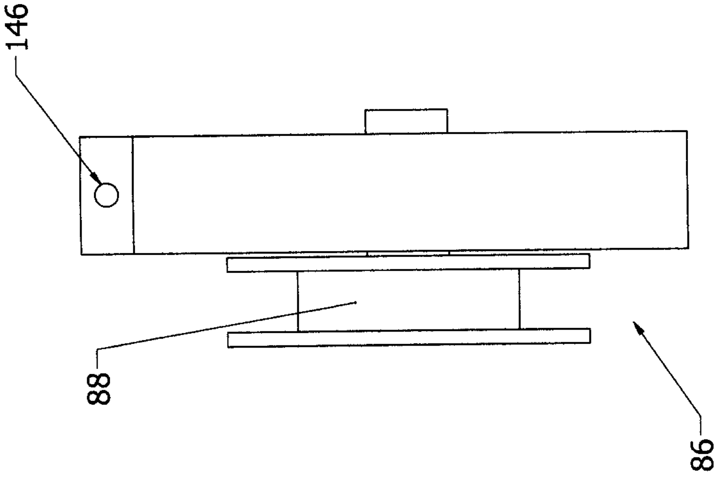
FIG. 44B is a front view of the power spring unit.

FIGS. 44A and 44B show more details of the power spring unit 86 and drum 88. A clock-work type power spring 92 attached to the shaft 150 produces torque on the shaft 150 which is connected to the drum 88. When the fly section 20 is fully retracted, the power spring 92 is wound most tightly. The power spring 92 unwinds (relaxes) as the fly section 20 moves toward the extended position. The power spring 92 is sized to apply torque on the drum 88 and so tension in the cable 32 and so partially offset the weight of the fly section 20 throughout the range of motion of the fly section 20. The power spring 92 is disposed in and protected by a housing 148. One end of the power spring 92 is attached to the housing 148 and the other end of the power spring 92 is attached to the shaft 150. By being attached to the housing 148, it is a fixed point about which the power spring 92 tightens or loosens as the shaft 150 rotates the power spring 92.

In another embodiment, the force applicator 26 is a foot pedal 94 which raises the fly section 20 a distance of one rung spacing each time the pedal is pressed down fully.

Figure 45:
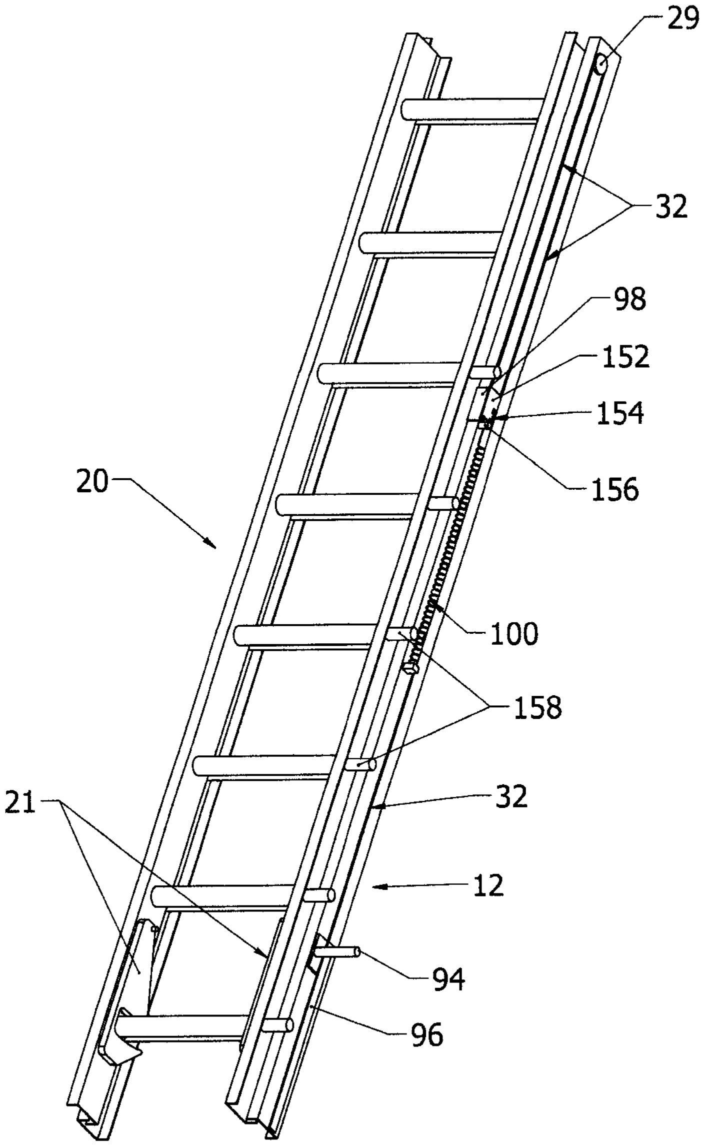
FIG. 45 is a perspective view of the extension ladder in a retracted position having a foot pedal.

FIG. 45 shows the ladder 10 with the fly section 20 retracted. A foot pedal 94 slides up and down in a foot pedal track 96 attached to the lower end of a base rail. A cable 32 is attached to the foot pedal 94. The cable 32 extends up to a base pulley 29 at the upper end of the base rail. The cable 32 passes around the base pulley 29 and is attached to a ratchet base 98. This ratchet base 98 is constrained to slide up and down the base rail. A tension spring 100 biases the ratchet base 98 to move down the first base rail 14, and so, also biases the foot pedal 94 to move upward in the foot pedal track 96 because of tension in the cable 32. The total travel of the ratchet or the foot pedal 94 is about 14 inches.

Figure 46:
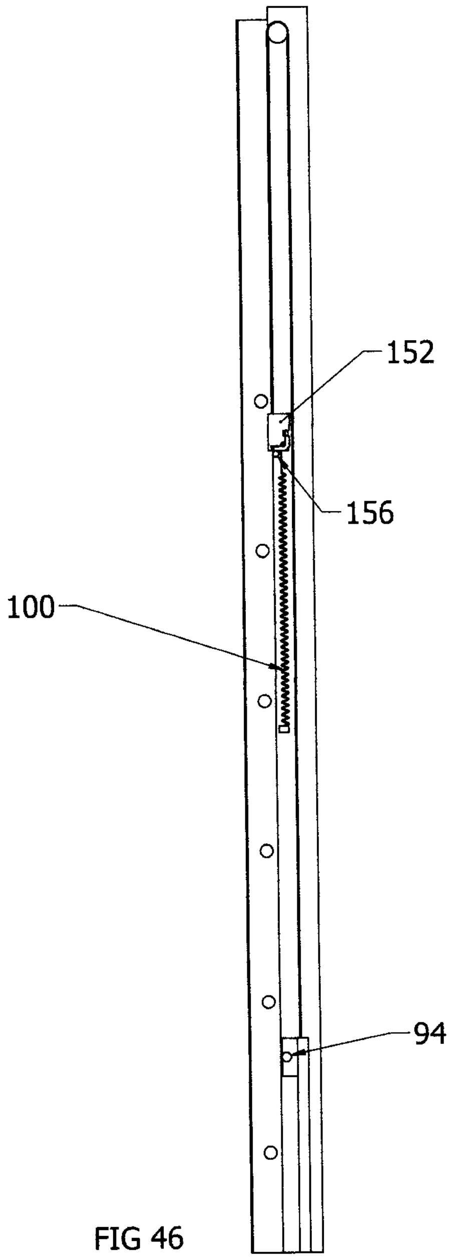
FIG. 46 is a side view of a portion of the ladder showing the tension spring, foot pedal up, ratchet stud and ratchet retracted.
Figure 47:
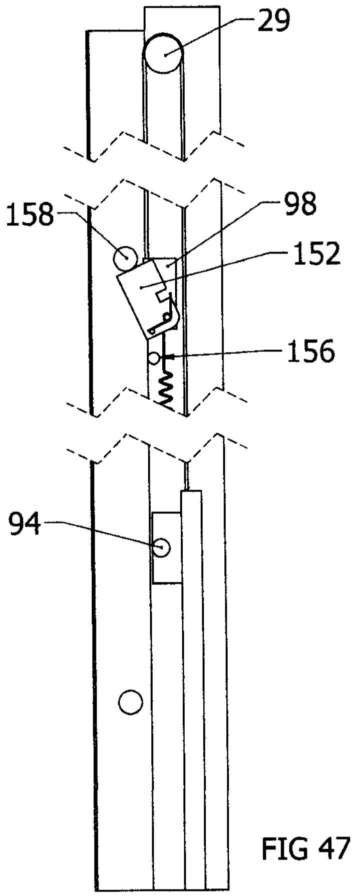
FIG. 47 is an enlarged view of a portion of the extension ladder showing extended ratchet engaging the fly stud and the foot pedal moved a short distance downward relative to FIG. 46.

A ratchet 152 is attached to the ratchet base 98. A ratchet spring 154 biases the ratchet 152 toward its extended position, as seen in FIGS. 46 and 47.

A ratchet stud 156 is attached to the ratchet base 98. When the ratchet base 98 is in its lowest position and therefore the foot pedal 94 is in its uppermost at-rest position, the ratchet stud 156 is in contact with the ratchet 152 and so causes it to be in its retracted position. Pushing down on the foot pedal 94 a short distance causes the ratchet base 98 to move upward and away from contact with the ratchet stud 156. This initial movement allows the ratchet 152 to move to its extended position.

Fly studs 158 are attached to the first fly rail 22 at incremental distances. These increments correspond to the distances between the ladder rungs 18. These fly studs 158 are located so as to engage with the ratchet 152 when the ratchet 152 is extended, but will pass freely over the ratchet 152 when it is retracted.

It is assumed that the ladder 10 is equipped with conventional ladder locks 21 and a standard hoisting rope arrangement. For simplicity, the hoisting rope and its pulley are shown only in FIGS. 52 and 53.

FIG. 46 shows a side view of the ladder 10 shown in FIG. 45. The foot pedal 94 is in its uppermost position. Contact with the ratchet stud 156 is holding the ratchet 152 in its retracted position. It should be noted that when the ladder 10 is in this condition, the hoisting rope could be used to raise or lower the fly section 20 in a conventional manner.

In FIG. 47, the user has pushed downward on the foot pedal 94 a short distance. This initial motion has allowed the ratchet 152 to extend so that it might engage a fly stud.

Figure 48:
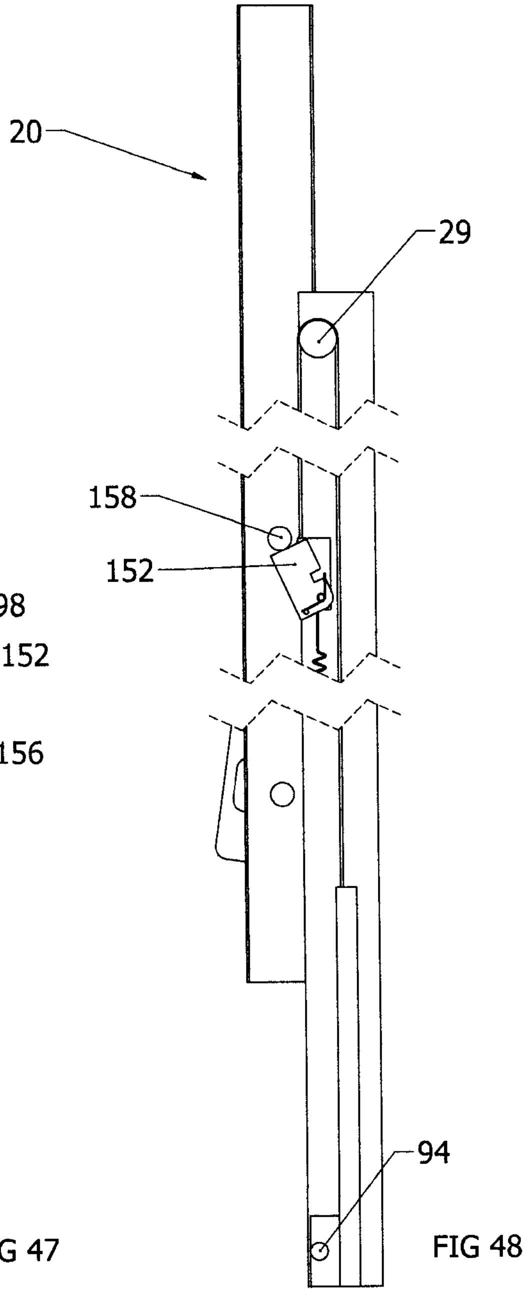
FIG. 48 is an enlarged view of a portion of the extension ladder showing the foot pedal fully down and the ratchet has moved the fly section up one incremental distance.
Figure 49:
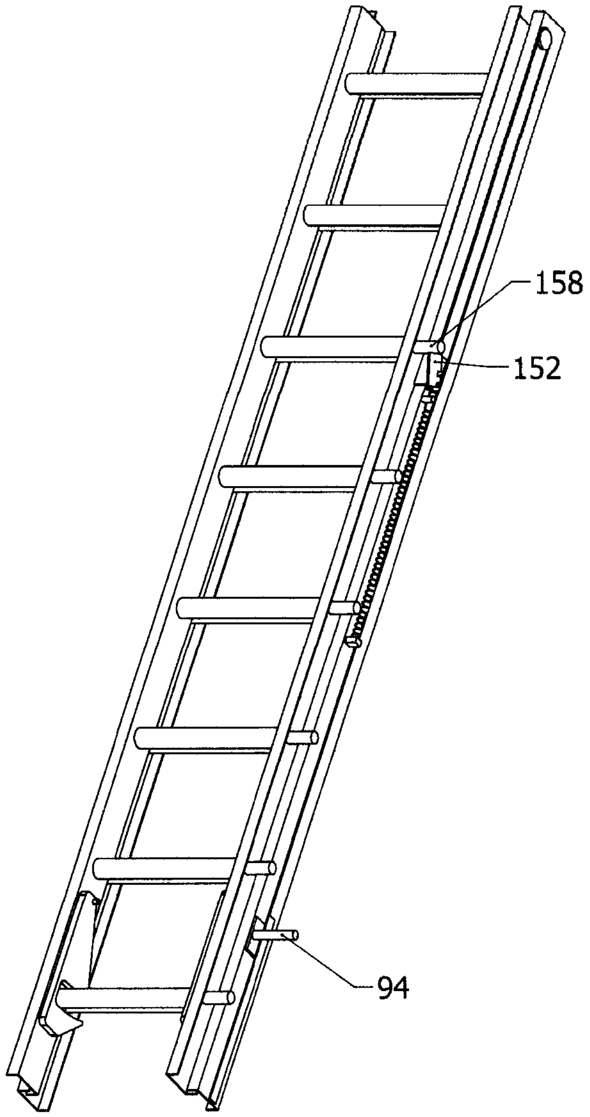
FIG. 49 is a perspective view of the extension ladder where the ratchet engages the fly stud.
Figure 50:
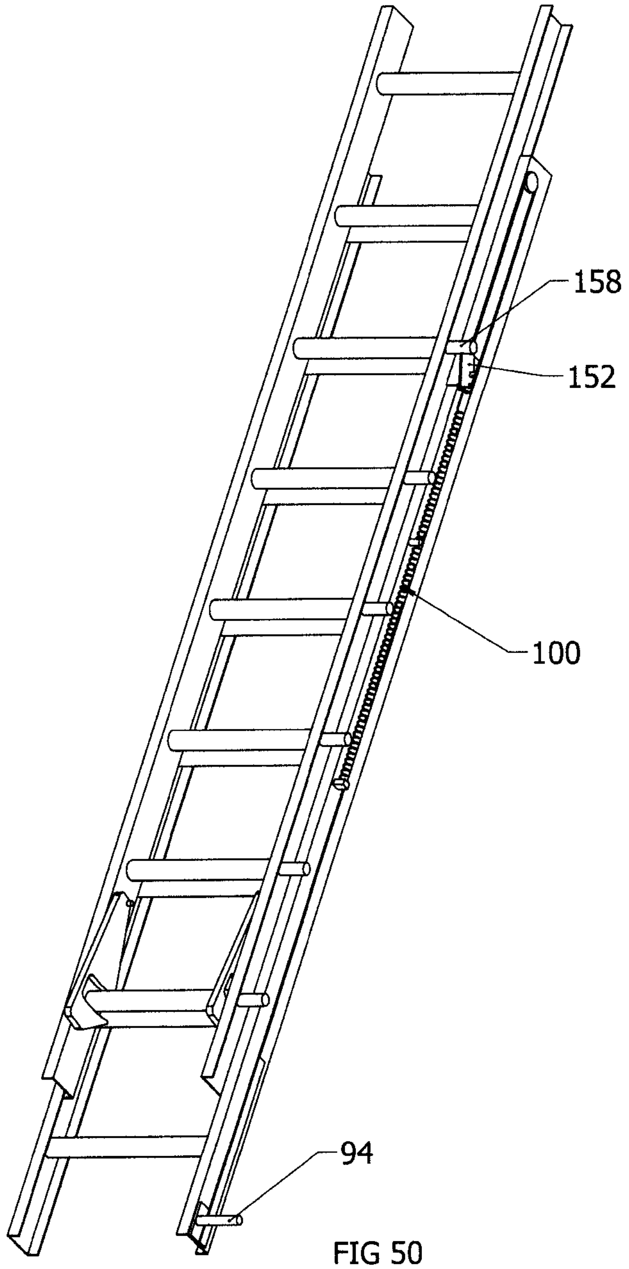
FIG. 50 is a perspective view of the extension ladder where the fly section is in a partially extended position and the foot pedal is fully down.

In FIG. 48, the user has pushed the foot pedal 94 all the way down. The ratchet base 98 and ratchet 152 have moved upward a full incremental distance, carrying a fly stud (and the first fly rail 22) with it. FIGS. 47 and 48 are seen in perspective in FIGS. 49 and 50.

After the fly section 20 has risen one incremental distance, the ladder locks 21 would engage the fly section 20 as usual. At this point, the user can allow the foot pedal 94 to rise to its uppermost position which lowers the ratchet base 98 and ratchet 152 until they are in a position to engage the next fly stud. By repeating the up and down motion of the foot pedal 94, the fly section 20 is easily raised, using leg strength, one rung at a time.

Figure 51:
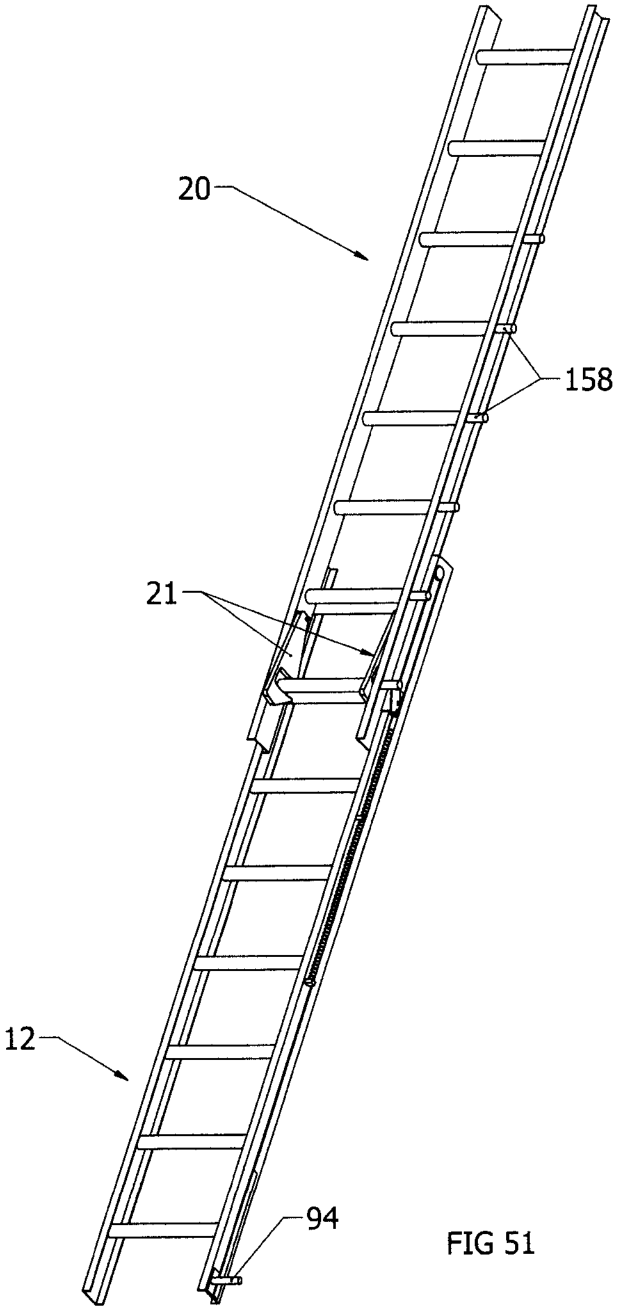
FIG. 51 is a perspective view of the extension ladder in the extended position with the foot pedal fully down.

FIG. 51 shows the ladder 10 which has just been fully extended, the foot pedal 94 is still down.

Figure 52:
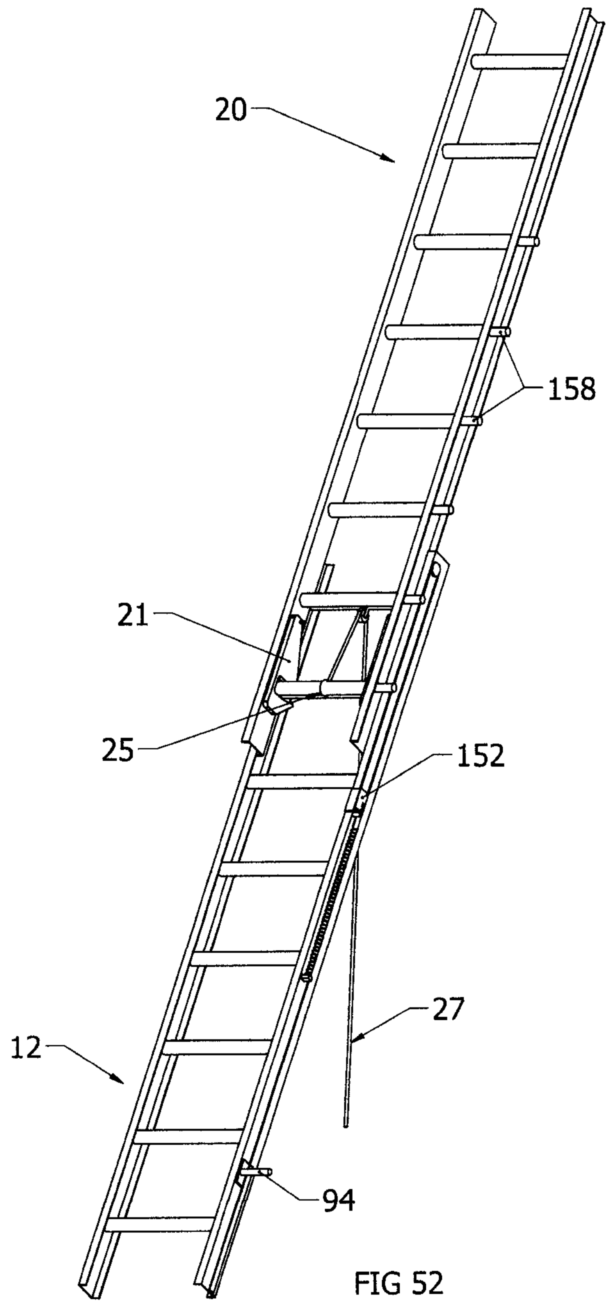
FIG. 52 is a perspective view of the extension ladder in the extended position with the ratchet retracted.
Figure 53:
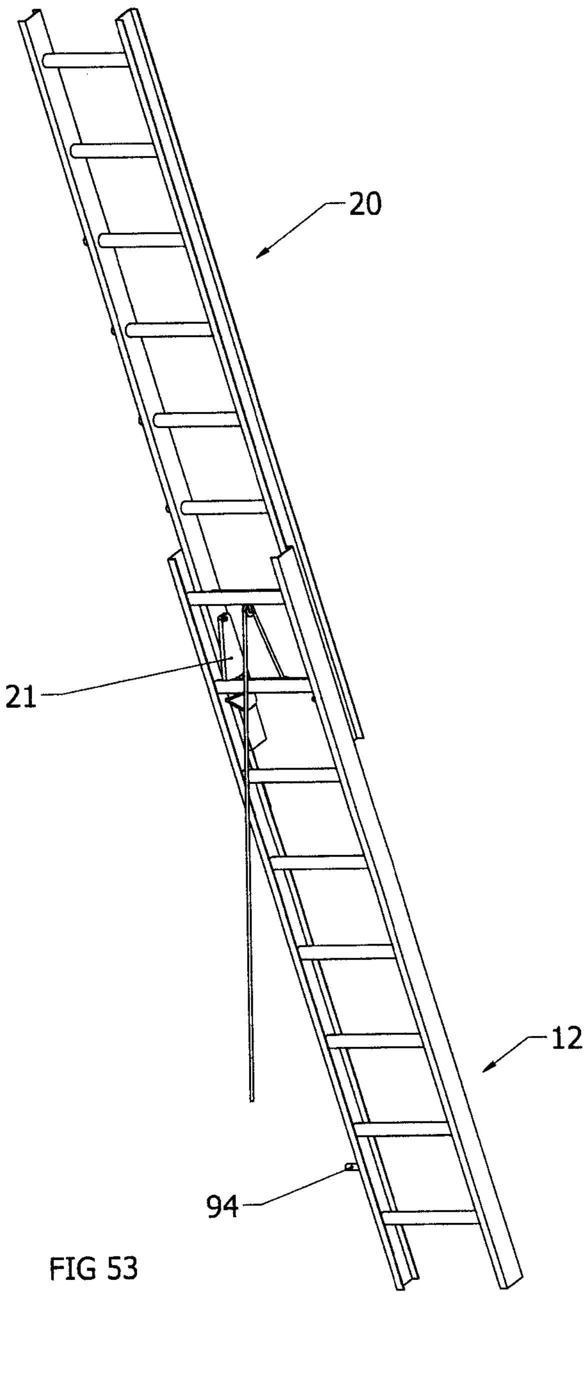
FIG. 53 is a perspective view of the underside of the extension ladder in the extended position having a foot pedal.

FIGS. 52 and 53 show the ladder 10 fully extended, the foot pedal 94 in its uppermost at-rest position, the ratchet 152 retracted. At this point the fly section 20 may be lowered using the hoisting rope in the conventional way.

Note that when the foot pedal 94 is in its uppermost position, the fly section 20 may be lowered from any incremental position by using the hoisting rope.

Figure 54:
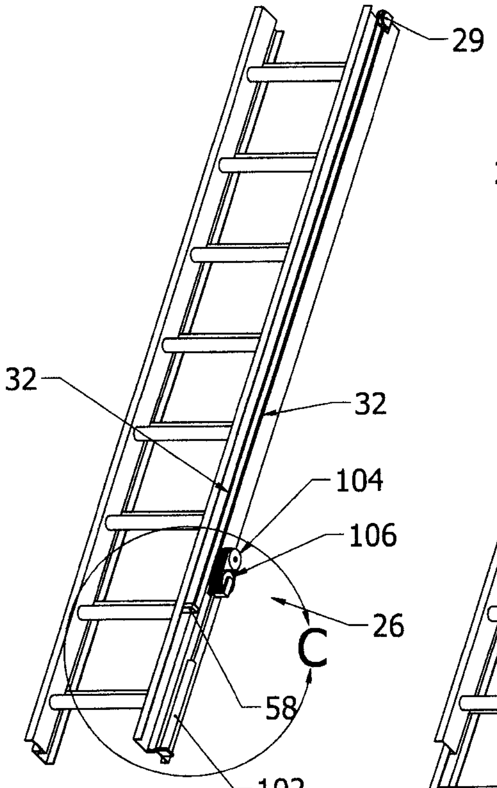
FIG. 54 is a perspective view of the extension ladder in a retracted position having a tension gas spring.
Figure 55:
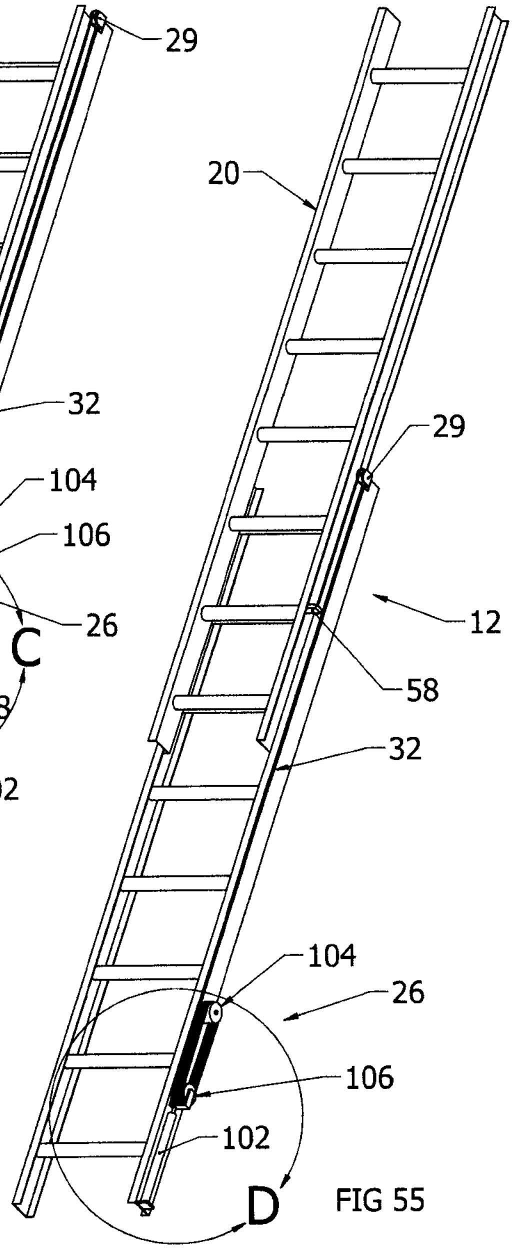
FIG. 55 is a perspective view of the extension ladder in an extended position having a tension gas spring.

In another embodiment, the force applicator 26 includes a tension gas spring 102, a fixed pulley block 104 and a moving pulley block 106. FIGS. 54 and 55 show views of the ladder 10 with the fly section 20 retracted and with the fly section 20 extended. The tension gas spring 102 is attached to the lower end of a first base rail 14. The base pulley 29 is attached to the upper end of the first base rail 14. The axle 110 of the fixed pulley block 104 is attached to the first base rail 14. The moving pulley block 106 is attached to the end of the tension gas spring piston rod 112. A cable 32 has one end attached to the fixed pulley block 104. The cable 32 passes back and forth between the fixed and moving pulley blocks 104, 106. The outgoing cable 32 extends to the base pulley 29, passes around it, and is attached to the first fly rail 22 at the fly cable attachment.

Figure 56:
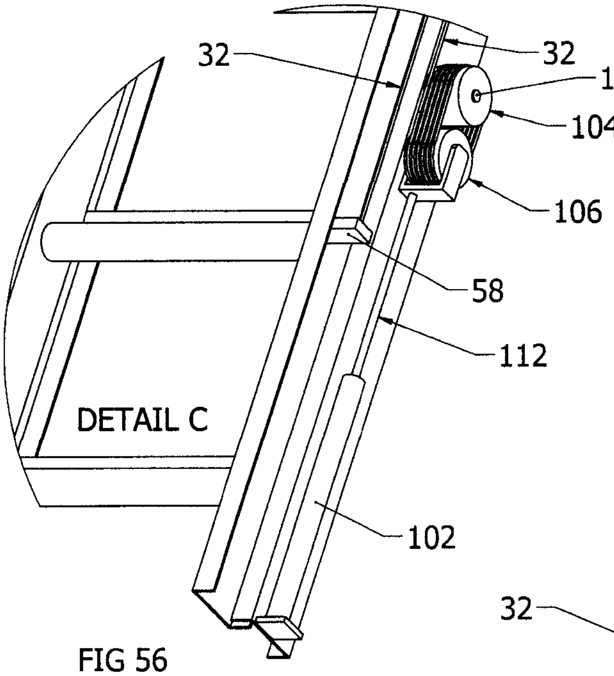
FIG. 56 is an enlarged view of a portion of the extension ladder in a retracted position showing the tension gas spring, fixed pulley block and moving pulley block.
Figure 57:
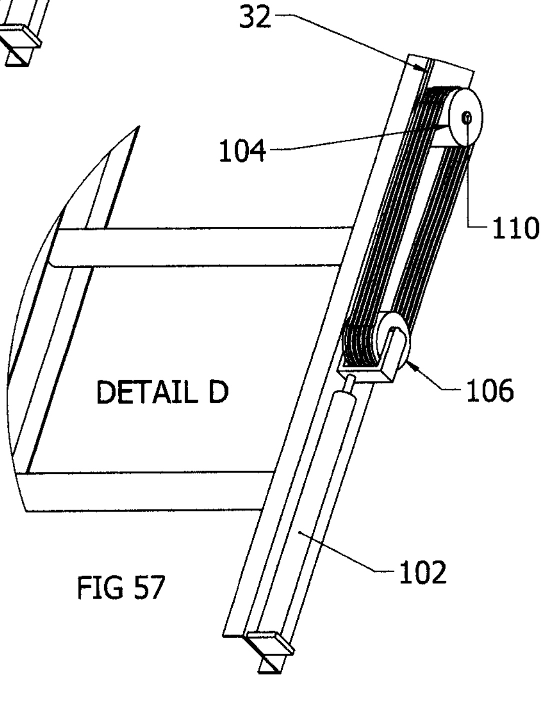
FIG. 57 is an enlarged view of a portion of the extension ladder in an extended position showing the tension gas spring, fixed pulley block and moving pulley block.

FIGS. 56 and 57 show the operation of the cable 32, pulley blocks, and tension gas spring 102. When the ladder fly section 20 is in the retracted position as shown in FIG. 56, the tension gas spring piston rod 112 is fully extended, which puts the pulley blocks close to each other. In this condition, enough cable 32 has been extended from the pulley blocks to allow the fly section 20 to be in its retracted position. When the ladder fly section 20 is in its extended position as shown in FIG. 57, the pulley blocks have been moved apart by the retraction of the tension gas spring piston rod 112 and cable 32 has been drawn into the pulley blocks which results in the fly section 20 being in its extended position.

The action of the pulley blocks is that of a conventional block and tackle arrangement. The motion of the moving pulley block 106 produces an amplified motion of outgoing cable 32 in proportion to the number of times the cable 32 passes back and forth between the pulley blocks. The tension in the cable 32 as it leaves the pulley blocks is reduced from the tension of the gas spring by that same ratio.

For example, if the cable 32 passes back and forth 10 times between the pulley blocks, the outgoing cable 32 tension will be 1/10 of the gas spring tension. But the outgoing cable 32 will extend 10 times the motion of the gas spring. So, a 200-pound gas spring with an 8-inch stroke will be able to supply a tension of 20 pounds over 80 inches of cable extension. This 20-pound tension can serve to counteract some amount of the fly section 20 weight, enabling the user to extend and retract the fly section 20 easily.

It is assumed that the counterbalance force will always be less than the weight of the fly section 20. Locking the fly section 20 at the desired height prior to climbing will be accomplished by conventional ladder locks 21 on the fly section 20 engaging the appropriate base rung.

Figure 58:
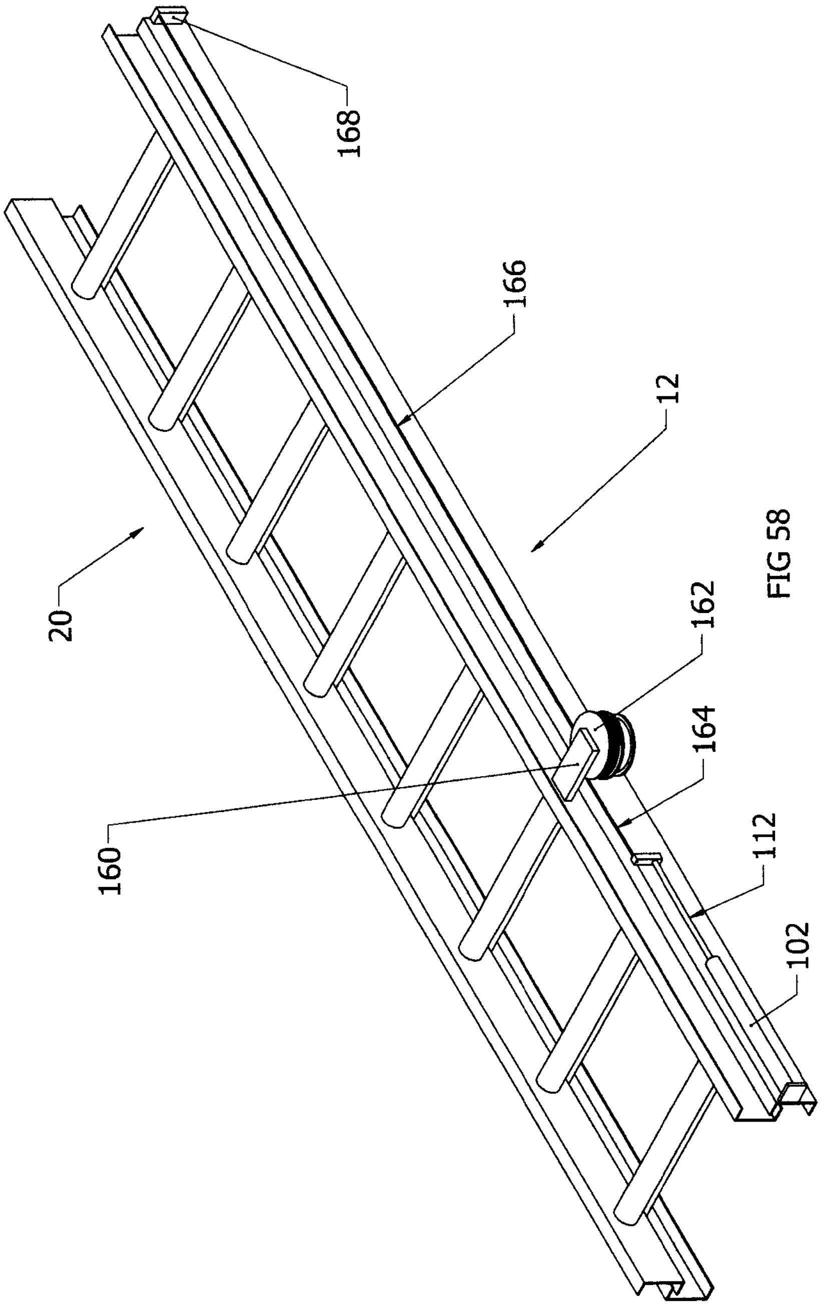
FIG. 58 is a perspective view of the extension ladder in a retracted position having a dual diameter drum.
Figure 59:
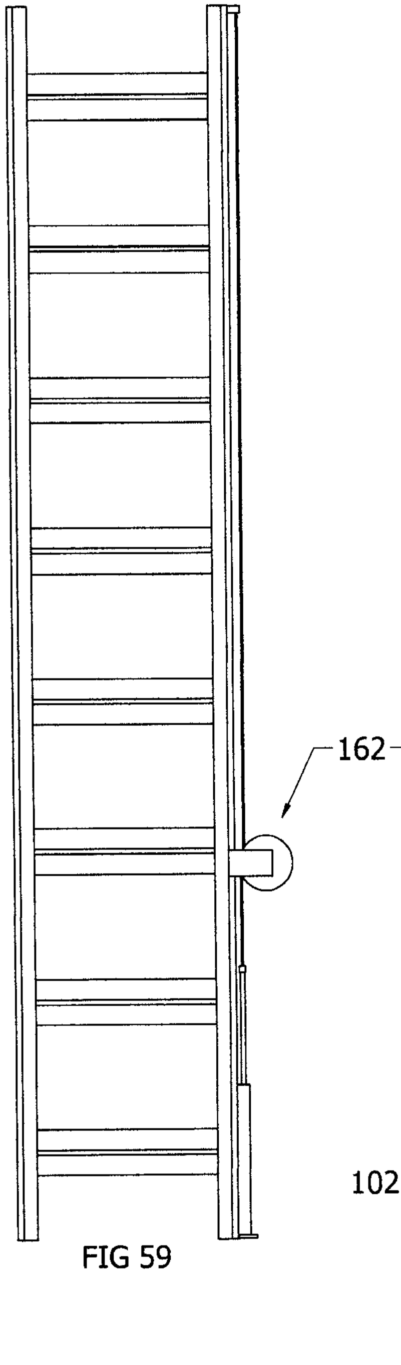
FIG. 59 is an overhead view of the extension ladder in a retracted position having a dual diameter drum.
Figure 60:
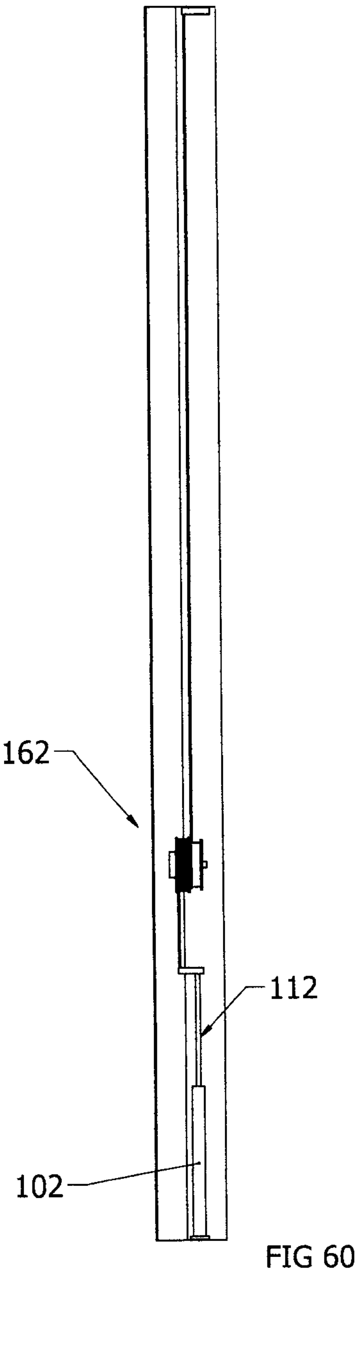
FIG. 60 is a side view of the extension ladder in a retracted position having a dual diameter drum.
Figure 61:
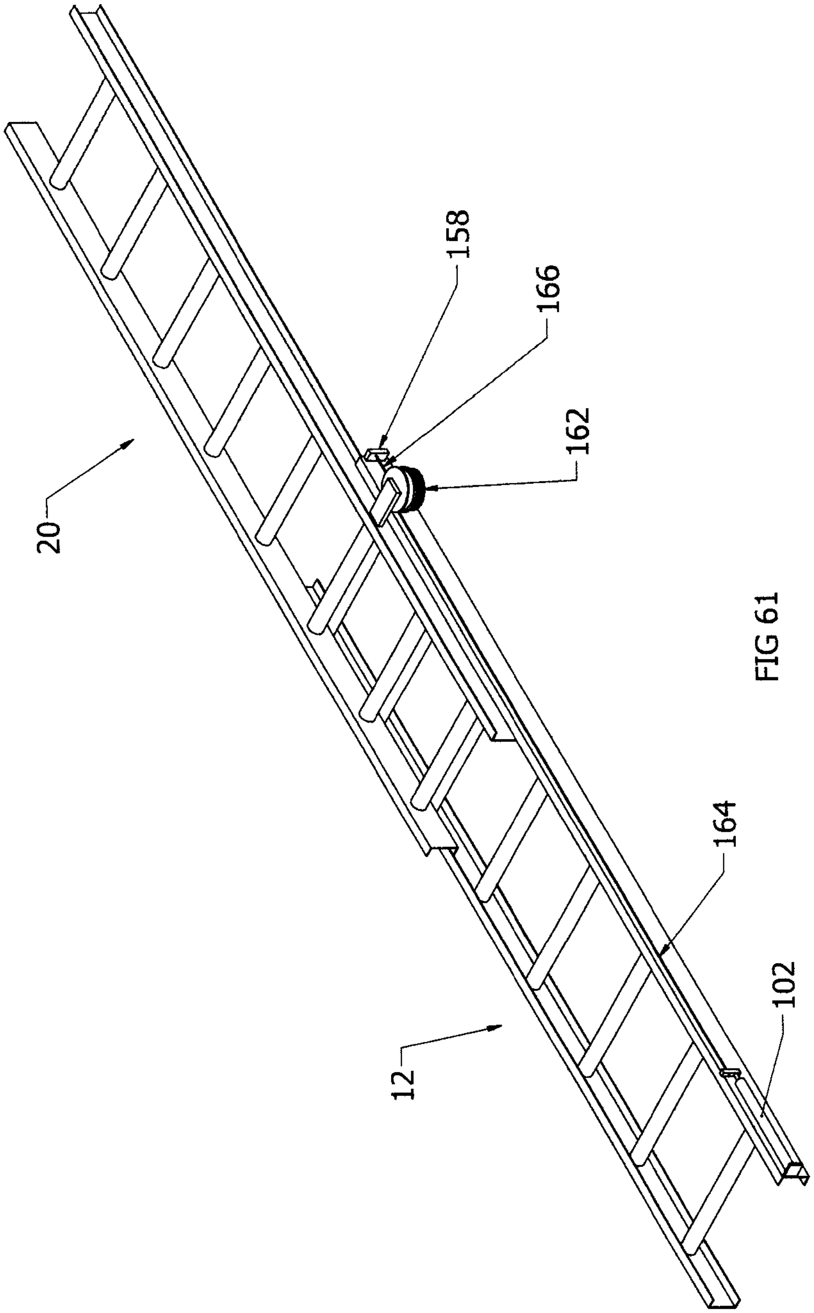
FIG. 61 is a perspective view of the extension ladder in an extended position having a dual diameter drum.
Figure 62:
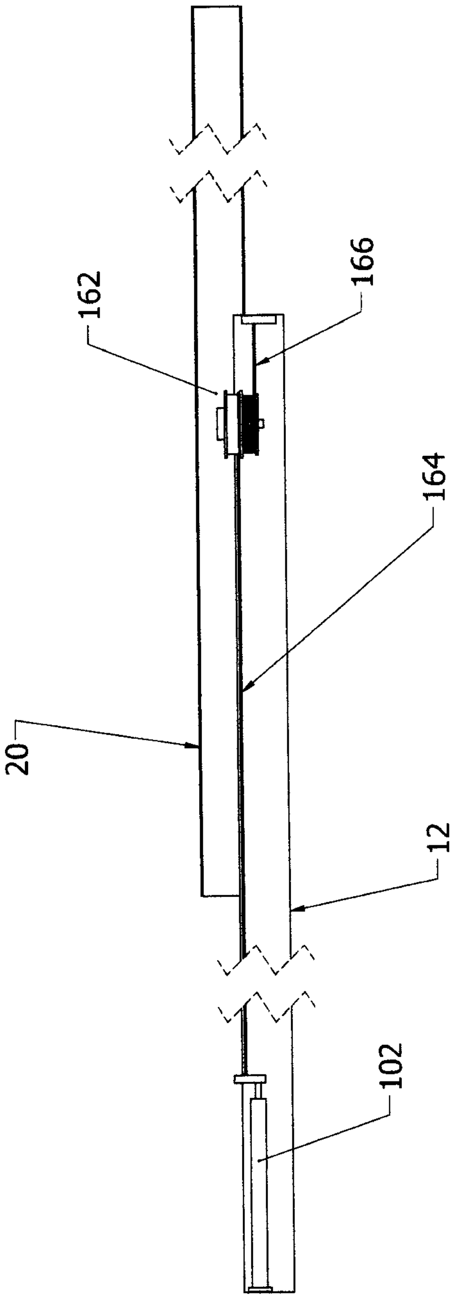
FIG. 62 is a side view of the extension ladder in an extended position having a dual diameter drum.
Figure 63:
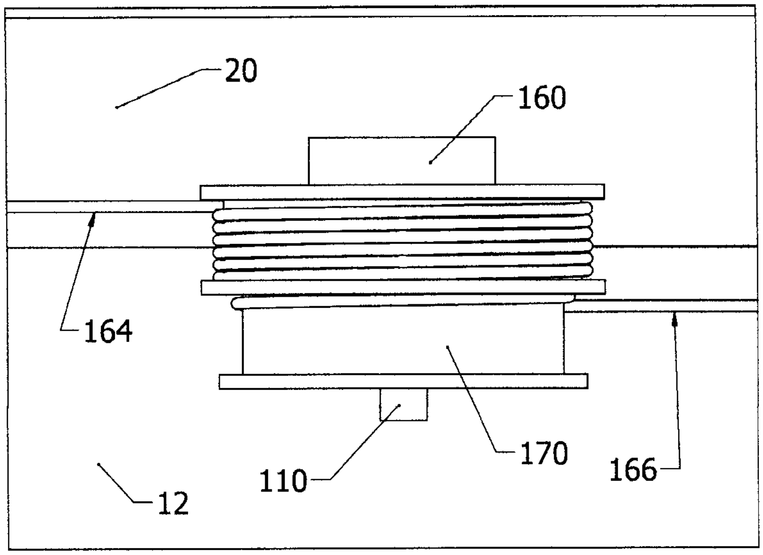
FIG. 63 shows a dual diameter drum when the extension ladder is in a retracted position.
Figure 64:
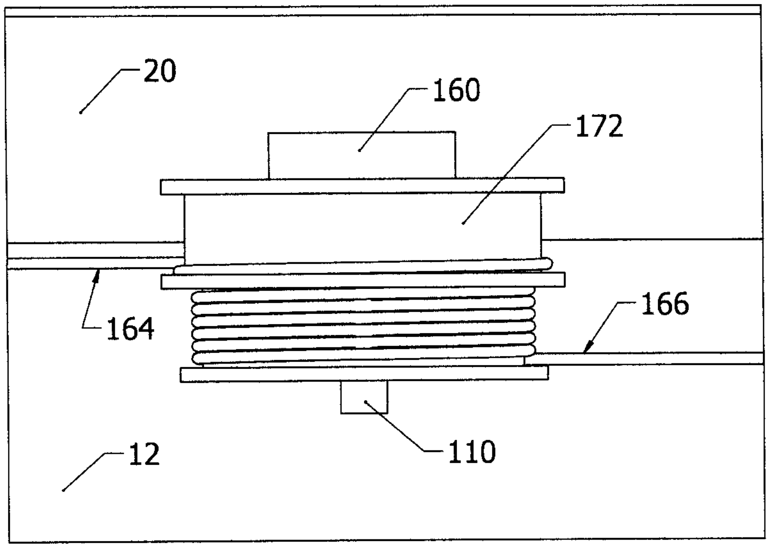
FIG. 64 shows a dual diameter drum and the extension ladder is in an extended position.

In another embodiment, the force applicator 26 includes a dual diameter drum 162. FIGS. 58, 59 and 60 show views of the ladder 10 with the fly section 20 retracted. A tension gas spring 102 is fixed to the lower end of the first base rail 14. A drum anchor 160 is attached to the first fly rail 22. A dual diameter drum 162 rotates on an axle 110 which is part of the drum anchor 160. There is a cable anchor 58 attached to the upper end of the base section 12. The lower cable 164 extends from the moving end of the gas spring and wraps around and is attached to the larger diameter portion 172 of the dual diameter drum 162. The upper cable 166 is attached to the cable anchor 58 and wraps around and is fixed to the smaller diameter portion 170 of the dual diameter drum 162. (FIGS. 63 and 64 show the drum diameters more clearly.) FIGS. 61 and 62 show views of the ladder 10 with the fly section 20 fully extended.

FIG. 63 and FIG. 64 show how the cables wrap around the dual diameter drum 162. When the fly section 20 is retracted as in FIG. 63, most of the lower cable 164 is wrapped around the larger diameter portion 172 of the dual diameter drum 162 and the upper cable 166 is mostly unwrapped from the smaller diameter portion 170 of the dual diameter drum 162. When the fly section 20 is extended as in FIG. 64, most of the lower cable 164 has unwrapped from the larger diameter portion 172 of the dual diameter drum 162 and most of the upper cable 166 has wrapped around the smaller diameter portion 170 of the dual diameter drum 162.

Figure 65:
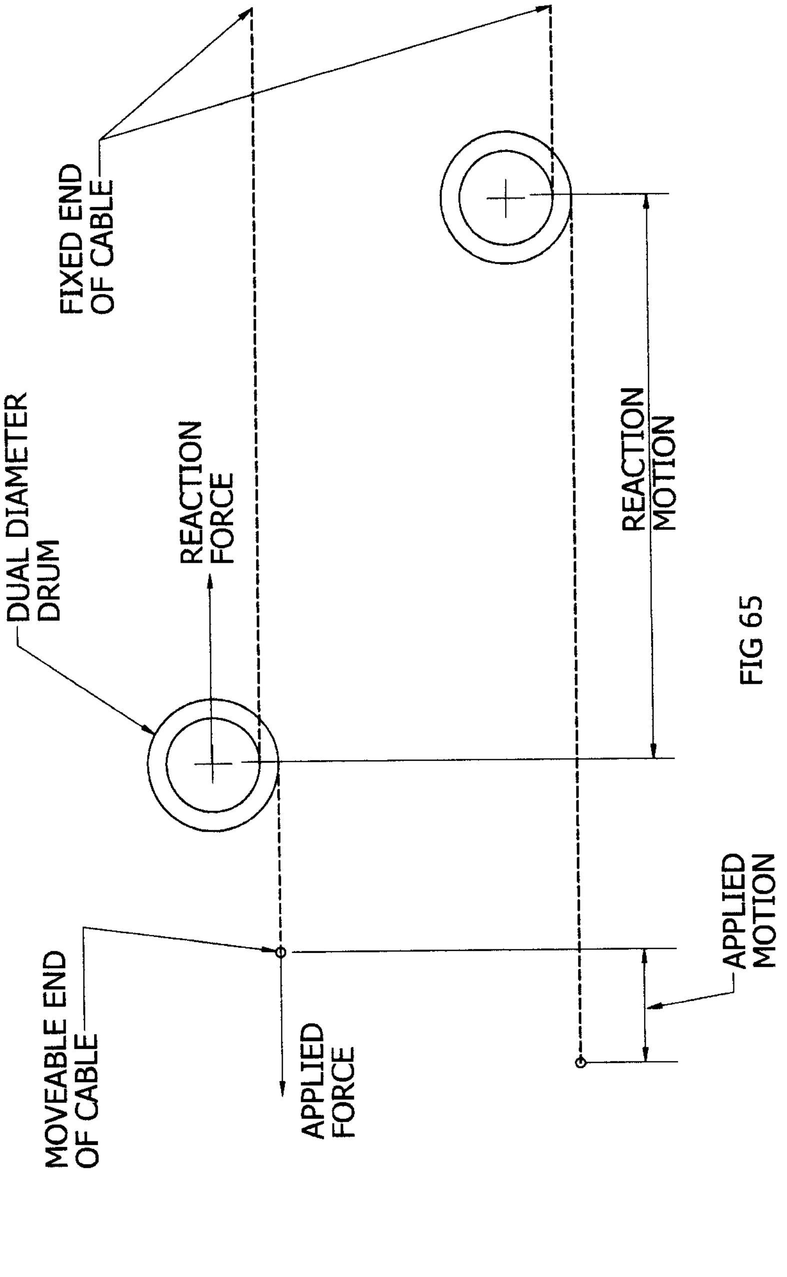
FIG. 65 shows the relationships between forces and motions of the extension ladder with a dual diameter drum.

FIG. 65 shows the principle of operation of this dual diameter drum 162 design. The upper part of FIG. 65 shows the drum 88 and cables when the fly section 20 is retracted. The gas spring applies a tension force to the movable end of the lower cable 164. The reaction force on the axle 110 of the drum 88 is a fraction of the applied force on the lower cable 164. This fraction is in proportion to the ratio of the two diameters of the dual diameter drum 162. This reaction force on the axle 110 acts on the fly section 20 to offset its weight. The lower part of FIG. 65 shows the dual diameter drum 162 and cables when the fly section 20 is extended. The dual diameter drum 162 will roll toward the fixed end of the upper cable 166 (carrying the first fly rail 22 with it) a distance which is a multiplication of the applied motion of the end of the cable 32.

For example, the diameters of the dual diameter drum 162 can be chosen so that an applied gas spring force of 200 pounds on the movable end of the cable 32 will produce a reaction force on the fly section 20 (through the axle 110) of 20 pounds. Consequently, 1 foot of motion at the movable end of the cable 32 will cause the fly section 20 to move 10 feet. Thus, a short stroke from a gas spring can produce a long travel of the fly section 20.

One other virtue of this embodiment is the fact that gas springs typically have a very low spring rate. So, the force which offsets the weight of the fly section 20 will remain nearly constant throughout the travel of the fly section 20.

This explanation and figures have shown a gas spring being used. Gas springs are desirable because of their very low spring rate over the length of their stroke. A low spring rate results in a uniform counterbalance force over the full range of the fly section's motion. However, more conventional springs, such as coil springs, could be used if a varying counterbalance force can be tolerated.

The present invention pertains to a method for using an extension ladder 10. The method comprises the steps of extending a fly section 20 of the extension ladder 10 relative to a base section 12 of the extension ladder 10. There is the step of leaning the fly section 20 against an object. There is the step of sliding the fly section 20 downwards relative to the base section 12 while a force applicator 26 attached to the fly section 20 and the base section 12 applies a counterbalancing force to the fly section 20 to effectively reduce a weight of the fly section 20. The object can be a wall or a pole.

The present invention pertains to a method for manufacturing an extension ladder 10. The method comprises the steps of attaching a cable anchor 58 to a first fly rail 22 of a fly section 20 of the extension ladder 10. There is the step of attaching a spring assembly 30 to a first base rail 14 of a base section 12 of the extension ladder 10, the fly section 20 slidingly attached to the base section 12. There is the step of attaching an end of a cable 32 which extends from the spring assembly 30 to the cable anchor 58.

The step of attaching the spring assembly 30 may include the steps of mounting a torque spring 34 around a torque shaft 38, fixing a second end 48 of a torque spring 34 to a torque rung body 42, and fixing a first end 46 of the torque spring 34 to a torque shaft flange 44 which is connected to the torque shaft 38. The torque shaft 38 extends and is connected to a torque drum 40.

The present invention pertains to a method for using an extension ladder 10. The method comprises the steps of extending a fly section 20 of the extension ladder 10 relative to a base section 12 of the extension ladder 10. There is the step of leaning the fly section 20 against an object 60. There is the step of sliding the fly section 20 downwards relative to the base section 12 while a force applicator 26 attached to the fly section 20 and the base section 12 applies a counterbalancing force from a motor engaged with the force applicator 26 to effectively reduce a weight of the fly section 20.

Each base rail having an upper end with a cap, and a lower end with a foot, each fly rail having an upper end with a cap and a lower end with a cap. Each foot may be rotatably attached to the lower end of each base rail, and may include a tread on the bottom of the foot to better grab the ground and prevent the ladder from sliding when leaning against an object. The foot may also include a spur plate extending from the foot to dig into the ground to better fix the ladder in place.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. An extension ladder comprising:

a base section including a first base rail and a second base rail in a spaced relation including a plurality of base rungs attached to and extending between the first base rail and the second base rail;

a fly section including a first fly rail and a second fly rail in a spaced relation including a plurality of fly rungs attached to and extending between the first fly rail and the second fly rail, the fly section slidably coupled to the base section; and a force applicator coupled to the base section and the fly section, the force applicator configured to offset at least a portion of a weight of the fly section, wherein the force applicator includes a spring assembly coupled to the base section and the fly section, wherein the spring assembly includes an output spool, a storage spool, and a power spring, wherein the power spring is attached to the output spool and the storage spool, wherein the extension ladder is movable between an extended state where at least a portion of the fly section is extended beyond the base section and a fully retracted state where the fly section is nested with the base section, and wherein the extension ladder is in an adjustment configuration when the extension ladder is moving between the extended state and the fully retracted state and the force applicator offsets at least the portion of the weight of the fly section when the extension ladder is in the adjustment configuration.

2. The extension ladder of claim 1 further comprising a housing covering the force applicator.

3. The extension ladder of claim 1 wherein the spring assembly offsets at least 30% of the weight of the fly section in the adjustment configuration as the fly section is extended and retracted relative to the base section.

4. The extension ladder of claim 1 wherein the spring assembly is disposed near a top portion of the base section.

5. The extension ladder of claim 1 wherein the power spring is substantially disposed on the output spool when the fly section is in the extended state relative to the base section.

6. The extension ladder of claim 1 wherein the power spring is substantially disposed on the storage spool when the fly section in the fully retracted state relative to the base section.

7. The extension ladder of claim 1 wherein the power spring traverses from the storage spool to the output spool in the adjustment configuration as the fly section is being extended relative to the base section.

8. The extension ladder of claim 1 wherein the power spring traverses from the output spool to the storage spool in the adjustment configuration as the fly section is being retracted relative to the base section.

9. The extension ladder of claim 1 further comprising a lock to hold the fly section to the base section at various positions in the adjustment configuration.

10. The extension ladder of claim 1 further comprising a pulley attached to one of the plurality of fly rungs and a hoist rope passed through the pulley in the adjustment configuration to extend the fly section relative to the base section.

11. The extension ladder of claim 1 wherein the output spool and the storage spool rotate in opposite directions in the adjustment configuration as the power spring traverses between the output spool and the storage spool.

12. An extension ladder comprising:

a base section including a first base rail and a second base rail in a spaced relation including a plurality of base rungs attached to and extending between the first base rail and the second base rail;

a fly section including a first fly rail and a second fly rail in a spaced relation including a plurality of fly rungs attached to and extending between the first fly rail and the second fly rail, the fly section slidably coupled to the base section; and a force applicator coupled to the base section and the fly section, the force applicator configured to offset at least a portion of a weight of the fly section, wherein the force applicator includes a spring assembly, and wherein the spring assembly further includes a drum portion and a cable configured to spool and unspool around the drum portion, wherein the drum portion is attached to an output spool, and wherein the cable is attached to the fly section, wherein the extension ladder is movable between an extended state where at least a portion of the fly section is extended beyond the base section and a fully retracted state where the fly section is nested with the base section, and wherein the extension ladder is in an adjustment configuration when the extension ladder is moving between the extended state and the fully retracted state and the force applicator offsets at least the portion of the weight of the fly section when the extension ladder is in the adjustment configuration.

13. The extension ladder of claim 12 wherein the fly section is biased towards the extended state by the spring assembly offsetting at least a portion of a weight of the fly section in the adjustment configuration when the fly section is being extended relative to the base section.

14. The extension ladder of claim 12 wherein at least a portion of a weight of the fly section is counteracted by the spring assembly in the adjustment configuration when the fly section is being retracted relative to the base section.

15. The extension ladder of claim 12 wherein the cable is attached to a lower portion of the fly section via a cable anchor.

16. The extension ladder of claim 12 wherein the spring assembly further includes a storage spool and a power spring.

17. The extension ladder of claim 16 wherein the power spring is attached to the output spool and the storage spool.

18. The extension ladder of claim 16 wherein the output spool and the storage spool rotate in opposite directions in the adjustment configuration as the fly section is extended and retracted relative to the base section.

19. The extension ladder of claim 16 wherein movement of the cable rotates the output spool in the adjustment configuration as the fly section is extended and retracted relative to the base section causing the power spring to traverse between the output spool and the storage spool.

20. An extension ladder comprising:

a base section including a first base rail and a second base rail in a spaced relation including a plurality of base rungs attached to and extending between the first base rail and the second base rail;

a fly section including a first fly rail and a second fly rail in a spaced relation including a plurality of fly rungs attached to and extending between the first fly rail and the second fly rail, the fly section slidably coupled to the base section;

a force applicator coupled to the base section and the fly section, the force applicator configured to offset at least a portion of a weight of the fly section; and a housing covering the force applicator, wherein the housing includes an external housing and an internal housing, wherein the internal housing is disposed on an inside portion of the base section and the external housing is disposed on an outside portion of the base section, wherein the force applicator includes a spring assembly coupled to the base section and the fly section, wherein the spring assembly includes an output spool, a storage spool, and a power spring, wherein the power spring is attached to the output spool and the storage spool, wherein the extension ladder is movable between an extended state where at least a portion of the fly section is extended beyond the base section and a fully retracted state where the fly section is nested with the base section, and wherein the extension ladder is in an adjustment configuration when the extension ladder is moving between the extended state and the fully retracted state and the force applicator offsets at least the portion of the weight of the fly section when the extension ladder is in the adjustment configuration.

21. An extension ladder comprising:

a base section including a first base rail and a second base rail in a spaced relation including a plurality of base rungs attached to and extending between the first base rail and the second base rail;

a fly section including a first fly rail and a second fly rail in a spaced relation including a plurality of fly rungs attached to and extending between the first fly rail and the second fly rail, the fly section slidably coupled to the base section; and a force applicator coupled to the base section and the fly section, the force applicator configured to offset at least a portion of a weight of the fly section, wherein the force applicator further includes a spring assembly including a power spring coupled to the base section and the fly section, wherein the extension ladder is movable between an extended state where at least a portion of the fly section is extended beyond the base section and a fully retracted state where the fly section is nested with the base section, and wherein the extension ladder is in an adjustment configuration when the extension ladder is moving between the extended state and the fully retracted state and the force applicator offsets at least the portion of the weight of the fly section when the extension ladder is in the adjustment configuration.

22. The extension ladder of claim 21 wherein the spring assembly further includes an output spool and a storage spool.

23. The extension ladder of claim 22 wherein the power spring is attached to the output spool and the storage spool.

24. The extension ladder of claim 23 wherein the power spring is substantially disposed on the output spool when the fly section is in the extended state relative to the base section.

25. The extension ladder of claim 23 wherein the power spring is substantially disposed on the storage spool when the fly section in the fully retracted state relative to the base section.

26. The extension ladder of claim 23 wherein the power spring traverses from the storage spool to the output spool in the adjustment configuration as the fly section is being extended relative to the base section.

27. The extension ladder of claim 23 wherein the power spring traverses from the output spool to the storage spool in the adjustment configuration as the fly section is being retracted relative to the base section.

* * * * *